United States Patent [19]
Oliver

[11] 4,063,146
[45] Dec. 13, 1977

[54] DIGITAL FIRING CONTROL FOR A CONVERTER

[75] Inventor: Theodore A. Oliver, Ann Arbor, Mich.

[73] Assignee: Reliance Electric Company, Cleveland, Ohio

[21] Appl. No.: 579,921

[22] Filed: May 22, 1975

[51] Int. Cl.² .............................................. H02P 7/28
[52] U.S. Cl. ...................................... 323/4; 318/332; 318/345 R; 323/225 C; 324/127; 328/155; 361/76; 363/8 T
[58] Field of Search .............. 307/133, 252 Q, 252 W; 317/46, 47, 48; 318/332, 333, 334, 345; 321/5, 18; 323/4, 225 C; 324/127; 328/155; 361/76, 77

[56] References Cited

U.S. PATENT DOCUMENTS

| 2,864,037 | 12/1958 | McConnell et al. | 317/47 |
| 3,551,748 | 12/1970 | Maynard et al. | 317/48 X |
| 3,758,720 | 9/1973 | Dinn | 328/155 X |
| 3,803,476 | 4/1974 | Reeve | 321/5 |
| 3,883,791 | 5/1975 | Zelina et al. | 321/5 |
| 3,936,726 | 2/1976 | Kelley | 323/225 C |

Primary Examiner—A. D. Pellinen
Attorney, Agent, or Firm—William J. Clemens

[57] ABSTRACT

A digital firing control for a three-phase full wave silicon controlled rectifier converter. An error signal, in digital form, representing a desired change in firing angle which is a function of the difference between the current being supplied by the converter and a desired current, is utilized to advance or retard the firing angle of the SCR's as required to eliminate the error. Each subsequent firing command is referenced on a time basis from the firing command of the previously fired SCR in the firing sequence rather than being referenced from the zero voltage point of the alternating current supply voltage. The error signal is averaged over the time interval between firing commands so that the control responds to the average difference between the current being supplied and the desired current.

49 Claims, 13 Drawing Figures

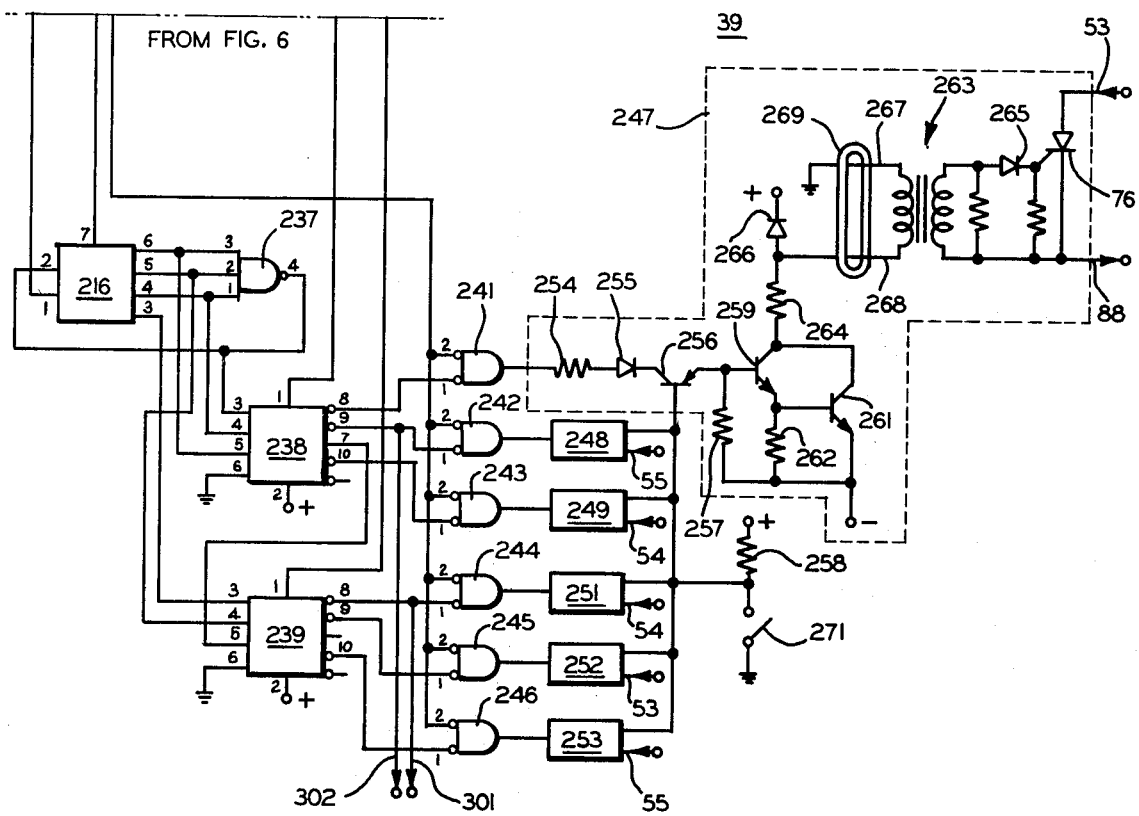
FIG. 7
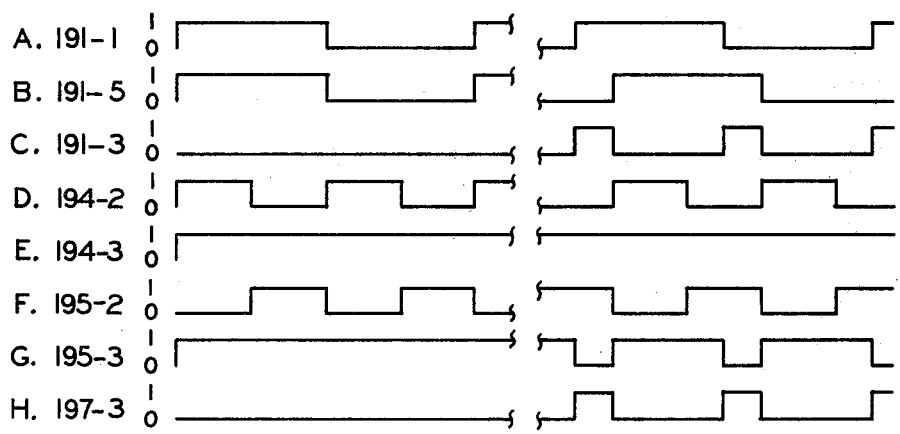
FIG. 8     FIG. 9

DIGITAL FIRING CONTROL FOR A CONVERTER

BACKGROUND OF THE INVENTION

1. Field of the Invention

This invention relates to control circuits for supplying current to a load in general and more particularly to a digital control circuit for the armature winding of a direct current electric motor.

2. Description of the Prior Art

The Ward Leonard system has been utilized for many years to supply armature current to direct current electric motors. In recent years, the thyristor type of static converter has been proposed as a substitute for the Ward Leonard system as the reliability of the thyristor converter has increased and the cost has decreased. Where a three-phase alternating current source is available, a first form of unidirectional static converter includes six silicon controlled rectifiers wherein each pair of SCR's is connected in a back-to-back parallel relationship between one of the power source lines and the armature winding. A reversible field control may be utilized to effect reverse rotation of the motor. However, this form of motor control has the disadvantage of slow response time when the direction of rotation is reversed since larger horsepower motors generally have relatively large field time constants. This disadvantage may be overcome by utilizing field forcing.

In a second type of controller, reversing switches are connected between the SCR's and the armature so that the armature current may be reversed to change the direction of the motor. This type of controller has the advantage of a faster current reversal time than the first type of controller, but this controller also has the disadvantage of requiring mechanical reversing switches which are more susceptible to failure than static elements. A third type of controller is known as an antiparallel converter and has double the number of SCR's to provide for armature current flow in either direction for changing the direction of rotation of the motor. This type of controller has the disadvantage of being more expensive than either of the first mentioned types of controllers.

Generally, in all these types of controllers, the firing signals for the SCR gates are developed using one of two methods. The first method is the pulse control method wherein a firing pulse is applied to the SCR gate when it is desired to turn the SCR on. These pulse control circuits may include a unijunction transistor relaxation oscillator or a magnetic trigger which applies a voltage to the SCR gate sufficient to turn on the SCR with reference to a point on the wave form of the power source. The magnetic trigger circuit may include a magnetic amplifier or a saturable reactor.

The second method of SCR firing is the phase shift method. The power source wave form is applied to a resistance-capacitance or a resistance-inductance network connected to the gate of the SCR. The network phase shifts the gate voltage wave form with respect to the power source wave form applied to the SCR anode, so that the portion of the power source wave form which is passed by the SCR can be determined by selecting the values of the network elements.

However, both the pulse control method and the phase shift method utilize the zero crossing point of the power source wave form as a reference point from which the firing angle is determined. Therefore, it is difficult to match the firing angles of a plurality of SCR's in a controller since each circuit element has a tolerance on its initial value and the values change as the elements age. In a motor control where the actual armature current is being compared with a current command signal, a change in either the command signal or the armature current may require several cycles before a stable state is reached, since the firing command which is generated may be correct for some of the SCR's but not correct for others as element values are mismatched or change with age.

SUMMARY OF THE INVENTION

The present invention concerns a digital firing control for generating firing commands to two or more triggerable switches wherein the switches are to be fired in a predetermined timed relationship to one another. The control is particularly suited for utilization with a converter for converting an alternating current power source to a direct current power source. The control may be used to generate firing commands to the gates of SCR's which are connected between a source of alternating current power and a load. As applied to the hoist motor of an elevator system, the field winding may be supplied from a suitable power supply while the present invention supplies a variable current to the motor armature.

In its preferred embodiment, the digital firing control is responsive to a signal representing a desired change in the current flow in the motor armature winding to change the time interval between the previously generated firing command and the next firing command to be generated so as to effect the desired change in current flow. The digital firing control includes a binary register which holds a digital word $\alpha$ equivalent to $\alpha_o + \Delta\alpha$ where $\alpha_o$ is a bias representing the time between firings when conditions are static or unchanging and $\Delta\alpha$ is the desired change in firing angle. Also included is a binary counter which accumulates a count representing the phase angle or time interval since the previous firing command was generated. The outputs of the register and the counter are compared so that when the output of the counter is equivalent to the desired change $\Delta\alpha$ plus the steady state bias $\alpha_o$, another firing command is generated. If no change in the firing angle is required, the counter accumulates a count equivalent to $\alpha_o$ which represents the predetermined phase angle bias or the time interval between firing commands for steady state operation.

It is an object of the present invention to provide an improved static converter for supplying an average direct current to a load from an alternating current power source.

It is another object of the present invention to provide an improved control circuit for the armature current supplied to the armature of a direct current motor.

It is a further object of the present invention to generate rectified alternating current pulses whereby the magnitude and conduction angle of the current pulses determine the magnitude of the current flowing in a motor armature.

It is another object of the present invention to provide a more responsive and more economical motor armature controller whereby firing commands are referenced from the previous firing command on a time basis which permits the use of circuit components having greater tolerances.

BRIEF DESCRIPTION OF THE DRAWINGS

FIGS. 5, 6 and 7 are schematic diagrams of the present invention as included in the direct current motor control system shown in block form in FIG. 4;

FIGS. 8, 9, 10 and 11 show various wave forms generated by the present invention;

DESCRIPTION OF THE PREFERRED EMBODIMENT

Figure 1:
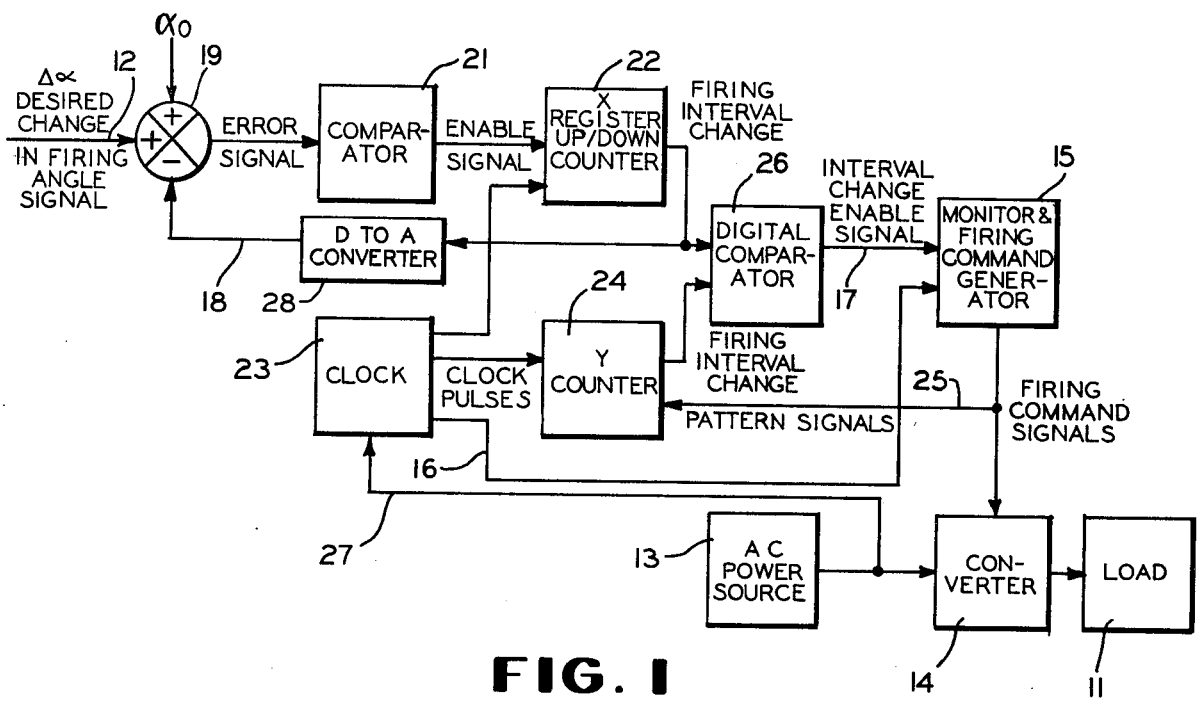
FIG. 1 is a functional block diagram of the present invention.

Referring to FIG. 1, there is shown a functional block diagram of the present invention which digitally generates firing commands to a converter for controlling the current flow in a load 11 in response to a desired change in a firing angle signal on an input line 12. The load 11 is supplied with direct current from an alternating current power source 13 through a converter 14 which may typically be of the type employing static switching elements which are selectively triggerable to pass a predetermined portion of the alternating current wave form. Each subsequent firing command is referenced on a digitally determined time basis from the previously generated firing command.

A firing command generator 15 generates firing command signals to the converter 14 to select the portion of the alternating current wave form to be passed to the load 11. The time interval between firing command signals is determined by the interval change enable signal on a line 17 which is monitored to ensure that one and only one firing command signal occurs during each one half cycle of the A.C. power source 13 wave form. Pattern signals are received on a line 16 to allow the generator 15 to properly gate the firing command signals.

The desired change in firing angle signal on the line 12 is added to $\alpha_o$, the steady state bias representing the time between firings under static conditions, and has subtracted from it a signal on a line 18 at a summing point 19 to generate an error signal as an input to a comparator 21. The comparator 21 extracts the sign of the error signal and presents it to an up/down control of an up/down counter, X counter 22, which continuously receives a pulse train from a clock 23. The digital output of the X counter is converted to an analog signal by a digital to analog converter 28 to generate the signal on the line 18. In this manner, the summing point 19, the comparator 21, the X counter 22 and the D to A converter 28 form a servoing analog to digital converter which continuously presents the digital equivalent of $\alpha_o + \Delta\alpha$ to a digital comparator 26. The X counter is the previously mentioned binary register.

A counter 24, the Y counter, also receives the pulses from the clock 23 and accumulates a count representing the total number of pulses received during the time interval between the firing command signals. Each firing command signal resets the Y counter to zero on a reset line 25. The accumulated count in the Y counter is equivalent to $\alpha_o + \Delta\alpha$. The $\alpha_o$ portion of the count represents a standard firing interval which may be defined in angular form as 360° divided by the number of static switch elements in the converter 14 which are to be independently controlled. For example, if the alternating current power source 13 is single-phase and the converter 14 is a full wave rectifier type, then two switching elements are typically utilized in back-to-back parallel relationship. Therefore, the standard firing interval would be 360°/2 = 180° and the firing command signals would be generated 180° apart with reference to the power source 13 wave form. If the power source 13 is three-phase and the converter 14 is a full wave rectifier type, then six switching elements are typically utilized in back-to-back parallel relationship. Therefore, for the three-phase power source the standard firing interval would be 360°/6 = 60°.

The $\Delta\alpha$ portion of the count accumulated in the Y counter represents the firing angle change from the standard firing angle $\alpha_o$. When the outputs of the X and Y counters are equal as determined by the digital comparator 26, the interval change enable signal is generated to the firing command generator 15.

In practice, $\Delta\alpha$ must be bounded in value in order to maintain the servo in a stable condition. Typically, $\Delta\alpha$ may be bounded so as not to exceed 20 percent of $\alpha_o$. This also implies a minimum wait period between successive firings. For example, if $\alpha_o$ is 60° and $\Delta\alpha$ is bounded by ± 12°, the minimum wait period becomes 48°. The maximum wait period would be 72°. Bounding $\Delta\alpha$ permits the X counter to have fewer bits than the Y counter, but the minimum wait period must be sent from the Y counter to the digital comparator 26 in the form of an enabling signal. This technique is illustrated in the preferred embodiment. Note that for this example, the total range of the X counter need be only 24°, or ± 12°, in which case the bias angle $\alpha_o$ entered at the summing point 19 would be equivalent to exactly 12°.

A change in $\Delta\alpha$ corresponds to a desired current change in the load, therefore, if the desired change in load current is present on the input line 12, the X counter will generate a firing interval change signal. The interval change enable signal will not be generated until the Y counter generates a firing interval change signal which equals the output of the X counter. Therefore, the standard firing interval will be contracted or expanded by the firing interval change to respectively advance or retard the standard firing interval until the desired change in load current is generated. The modified firing interval will shift the firing command signals relative to the wave form of the power source 13 to increase or decrease the average current in the load which in turn decreases the desired change in load current signal to zero. When the desired change in load current signal reaches zero, the standard firing interval will be maintained between the firing command signals at the shifted firing point with respect to wave form of the power source 13.

The clock 23 generates clock pulses to the X counter 22 and the Y counter 24 which pulses are synchronized with the wave form of the power source 13 to increase or decrease the average current in the load which in turn decreases the desired change in load current signal to zero. When the desired change in load current signal reaches zero, the standard firing interval will be maintained between the firing command signals at the shifted firing point with respect to wave form of the power source 13 on a line 27. Therefore, the time interval between pulses represents an angular portion of the wave form. For example, if the wave form is "60Hz" alternating current and the clock frequency is "115.2Hz", the accumulation of each clock pulse in a counter represents 0.1875° of the 360 wave form cycle.

Figure 2:
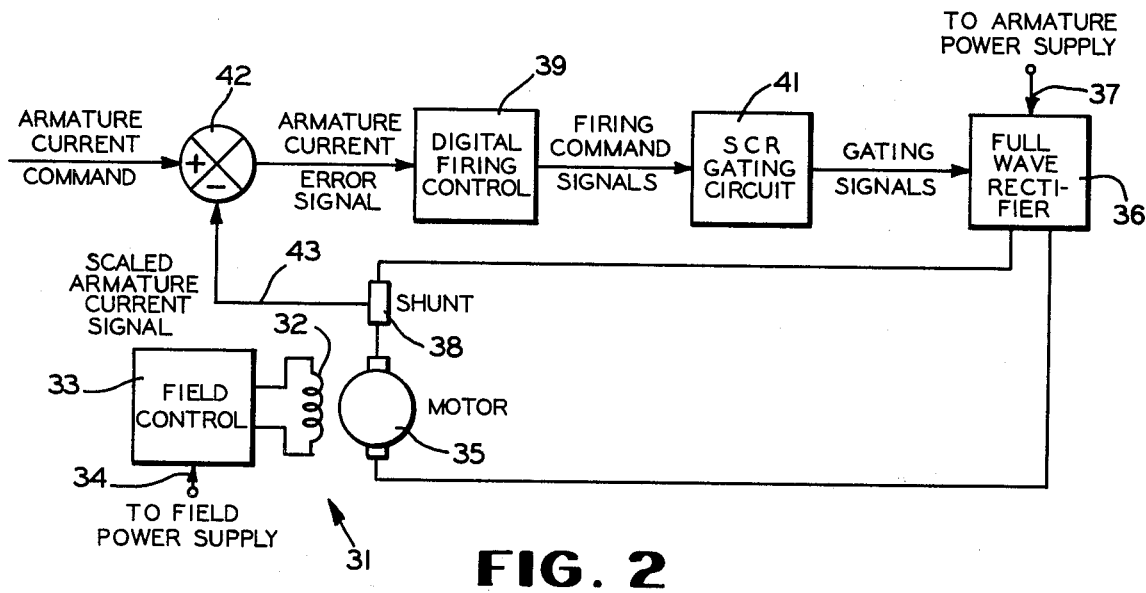
FIG. 2 is a functional block diagram of a direct current motor control system including the present invention.

Referring to FIG. 2, there is shown a functional block diagram of a direct current motor control system including the present invention according to the embodiment shown in FIG. 1. The load 11 of FIG. 1 is shown as an armature 35 of a motor 31. The converter 14 which passes alternating current power from the power source 13 is a full wave rectifier 36 which is connected to an armature power supply by a line 37 and a SCR gating circuit 41. The desired change in load current signal on the line 12 is an armature current error signal from a summing point 42. The blocks 15, 21, 22, 23, 24, and 26 are included in a digital firing control 39.

In FIG. 2 the direct current shunt field electric motor 31 includes a field winding 32 supplied with direct current power from a suitable field control 33 connected to a field power supply (not shown) by a line 34. The motor 31 also includes the armature 35 which is supplied with direct current power from the full wave rectifier 36. The rectifier 36 converts alternating current, from an armature power supply (not shown) connected to the line 37, to direct current which is measured at a shunt 38 connected in series between the rectifier 36 and the motor armature 35.

The current flowing in the motor armature 35 is controlled by the digital firing control 39 and the SCR gating circuit 41. An armature current command signal has subtracted from it a scaled armature current signal at the summing point 42 to generate an armature current error signal. The scaled armature current signal is generated by the shunt 38 on a line 43. The digital firing control 39 responds to the armature current error signal by generating firing command signals to the SCR gating circuit 41 to determine the amount of the alternating current wave form on the line 37 which will be passed by the rectifier 36. The SCR gating circuit 41 generates gating signals to the SCR's of the full wave rectifier 36 to turn the SCR's on to rectify a selected portion of the alternating current wave form. If the armature current command is equal to the scaled armature current signal, then the armature current error signal will be zero and the digital firing control 39 will generate firing command signals spaced the correct number of electrical degrees apart to maintain the gating signals from the SCR gating circuit 41 at the same points on the alternating current wave form to generate the required direct current for the motor armature. If either the armature current command or the scaled armature current signal changes value, an armature current error signal will be generated and the digital firing control will respond. The control 39 will either retard or advance the firing command signals with respect to one another until the armature current has either decreased or increased respectively to drive the armature current error signal to zero. As the armature current error signal is driven toward zero, the amount of advancement or retardation is gradually decreased until the firing command signals are returned to their former steady state relationship.

Figure 3:
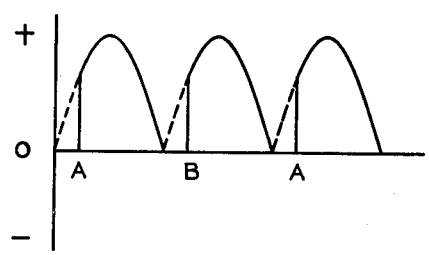
FIG. 3 is a single-phase alternating current wave form which has been full-wave rectified and has a selected portion of each one-half cycle blocked according to the present invention.

In the case of a single-phase alternating current source, the firing command signals would ordinarily be digitally generated 180° apart. Referring to FIG. 3, there is shown a full wave rectified single phase alternating current wave form having a selected portion of each one-half cycle blocked by the SCR's of the rectifier 36. For example, the digital firing control 39 generates a first A firing command at approximately 45° from the starting point of the first positive one-half cycle of the wave form so that the rectifier 36 blocks the first 45° and passes the remaining 135° portion. Next the first negative one-half cycle is rectified and the control digitally generates a B firing command 180° from the A firing command or 225° from the starting point of the first positive one-half cycle of the wave form. Therefore, the first 45° of the first negative one-half cycle is blocked and the remaining 135° portion is passed by the rectifier 36. A second A firing command is digitally generated 180° from the first B firing command during the second positive one-half cycle of the wave form and this firing sequence will be maintained as long as the armature current command equals the scaled armature current signal. Although each firing command is digitally generated with reference to the previously generated firing command, the commands are synchronized with the alternating current wave form.

If, for example, increased armature current is required, the armature command signal will become more negative to generate a negative armature current error signal. The digital firing control 39 of FIG. 2 will respond to the negative error signal by decreasing the interval between the firing command signals to less than 180° to shift the point of firing toward the start of each one-half cycle thereby increasing that portion of the wave form which is passed and the current flow. As the point of firing is shifted, the interval between the firing commands will be increased to 180° to maintain the firing points at the shifted position.

Figure 4:
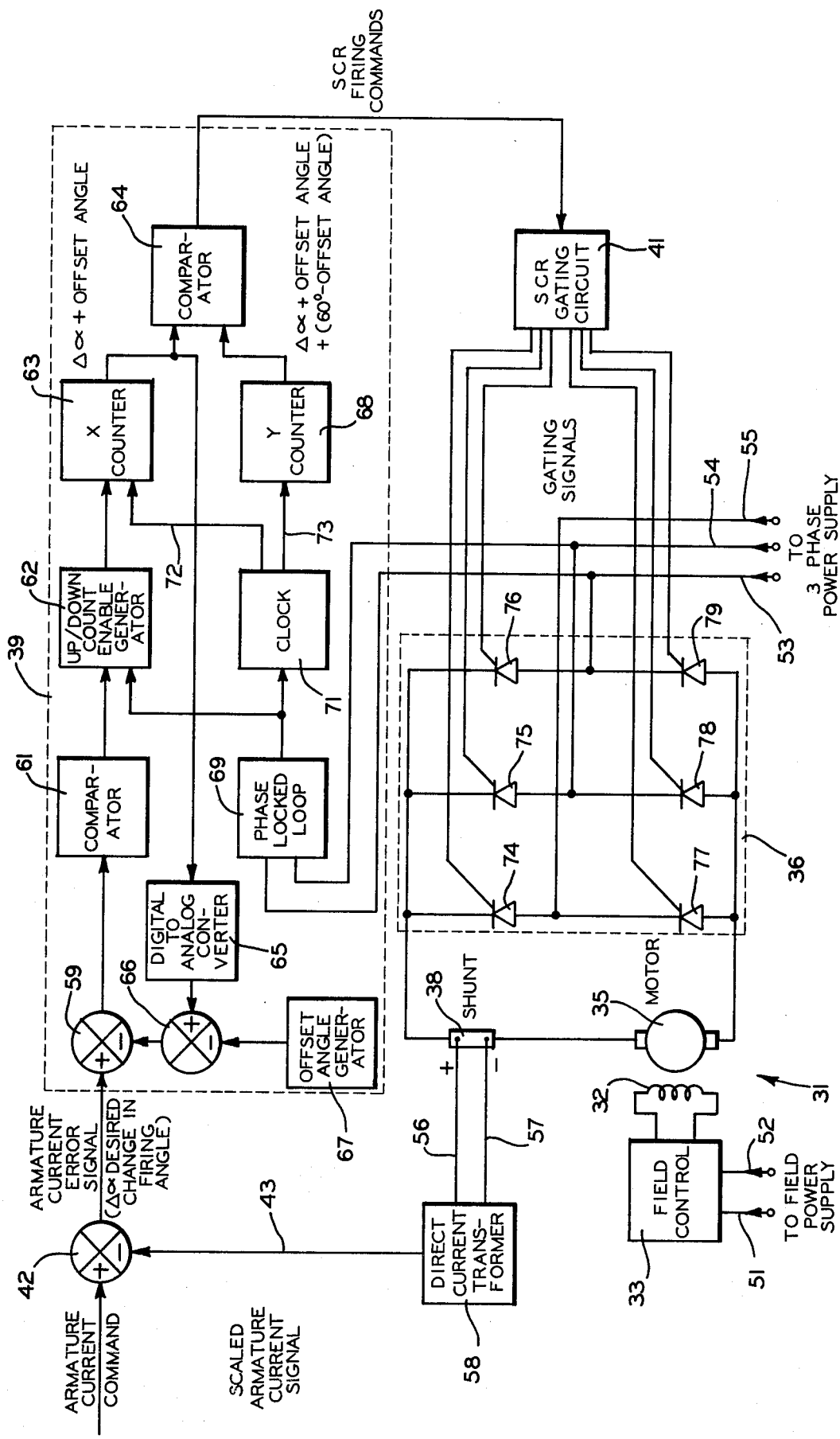
FIG. 4 is a more detailed block diagram of the motor control system of FIG. 2.

Referring to FIG. 4, there is shown a more detailed block diagram of the motor control system of FIG. 2. The motor 31 has a shunt field winding 32 which is supplied with direct current power through a suitable field control 33. The field control 33 is connected to a source of power (not shown) by the input lines 51 and 52. The motor 31 has an armature 35 which is supplied with direct current power through a full wave rectifier 36. The rectifier 36 is connected to a three-phase alternating current power source (not shown) by three input lines 53, 54 and 55. The direct current flowing in the motor armature 35 is measured utilizing a shunt 38 which generates a signal representing current flow on the lines 56 and 57 to a direct current transformer 58. The direct current transformer 58 generates the scaled armature current signal on the line 43 to the summing point 42. The armature current command has subtracted from it the scaled armature current signal at the summing point 42 to generate the armature current error signal or the $\Delta\alpha$, the desired change in firing angle, signal which is shaped by a reset integrator (not shown) before being applied to the digital firing control 39.

The armature current error signal or $\Delta\alpha$ signal is typically an analog signal and has subtracted from it a feedback signal at a summing point 59. The output signal from the summing point 59 is the input to a comparator 61 which generates advance or retard signals to an up-down count enable generator 62. The retard signal is generated when the $\Delta\alpha$ signal has a negative polarity at the input to the summing point 59 which occurs when either the armature current command is reduced or the scaled armature current signal increases. The advance signal is generated when the $\Delta\alpha$ signal has a positive polarity at the input to the summing point 59 which occurs when either the armature current command is increased or the scaled armature current signal decreases. The enable generator 62 responds to the retard and advance signals by generating up or increment and down or decrement enable signals respectively to the inputs of a counter 63, the X counter, which accumulates a total number of counts representing the length of time one of the input signals is present. The X counter is preset at a value representing an offset angle (the bias $\alpha_o$ of FIG. 1) to which counts are added to retard the firing angle or from which counts are subtracted to advance the firing angle. The output of the X counter is the input to a comparator 64 and a digital to analog converter 65. The X counter output, representing $\Delta\alpha$ plus the offset angle, is changed from digital to analog form by the digital to analog converted 65 and applied to a summing point 66. An offset angle generator 67 generates a signal representing the offset angle that is preset into the X counter. This offset angle is subtracted at the summing point 66 to generate a $\Delta\alpha$ signal to the summing point 59 as the feedback signal which stabilizes the system.

When power is first applied to the control, the SCR gating circuit 41 is prevented from issuing gating signals until it is determined that the power supply is connected to the input lines 53, 54, and 55 in the correct phase relationship. At the same time a phase back signal is applied to the armature current command input line at the summing point 42 to fully retard the firing angle for start up of the control. When the SCR gating circuit 41 is enabled and the phase back signal is removed, the control will fire the SCR's in the fully retarded position until an armature current command signal is applied to generate a $\Delta\alpha$ signal.

The comparator 64 has as its inputs the $\Delta\alpha$ plus offset angle output from the X counter and the output from a counter 68, the Y counter. A phase locked loop 69 has as its inputs one of the phases from the three-phase armature power supply (not shown), such as the phase between the input lines 53 and 54. The phase locked loop 69 generates a train of clock pulses to the enable generator 62 and a clock pulse generator 71. The frequency of the pulse train generated is a multiple of the armature power supply frequency and the pulses represent angular increments of the power supply wave form referenced from the zero crossing points of the wave form. The clock 71 is responsive to the pulse train from the phase locked loop 69 to generate pulse trains on a pair of lines 72 and 73 to the X and Y counters respectively. The X counter is enabled by the output signal from the enable generator 62 to add to or subtract from the accumulated offset angle the number of clock pulses representing $\Delta\alpha$. The Y counter accumulates clock pulses to a total representing $\Delta\alpha$ added to or subtracted from the offset angle plus 60° minus the offset angle or $\Delta\alpha$ added to or subtracted from 60°. When the X and Y counters reach their respective totals, the comparator 64 generates a firing command to the SCR gating circuit 41. Therefore, if $\Delta\alpha$ is equal to zero, firing commands will be generated every 60° during the cycle of a wave form having the same frequency as the armature power supply.

The SCR gating circuit 41 generates a gating signal, in response to the SCR firing command, to the gate of one of the SCR's 74, 75, 76, 77, 78 and 79 in the full wave rectifier 36. The SCR gating circuit 41 selects each SCR for firing in a predetermined sequence to supply full wave rectified current to the motor armature 35, each SCR being fired at a 60° standard firing angle after the last SCR was fired. When a change in armature current flow is required, $\Delta\alpha$ is generated and added to or subtracted from 60° to retard or advance the firing angle by shifting the position of subsequent gating signals with respect to the previous gating signals as referenced to the armature power supply wave form. When the scaled armature current signal again equals the armature current command, $\Delta\alpha$ will be reduced to zero and then each SCR will be fired 60° after the last SCR was fired but at a new firing angle.

Figure 5:
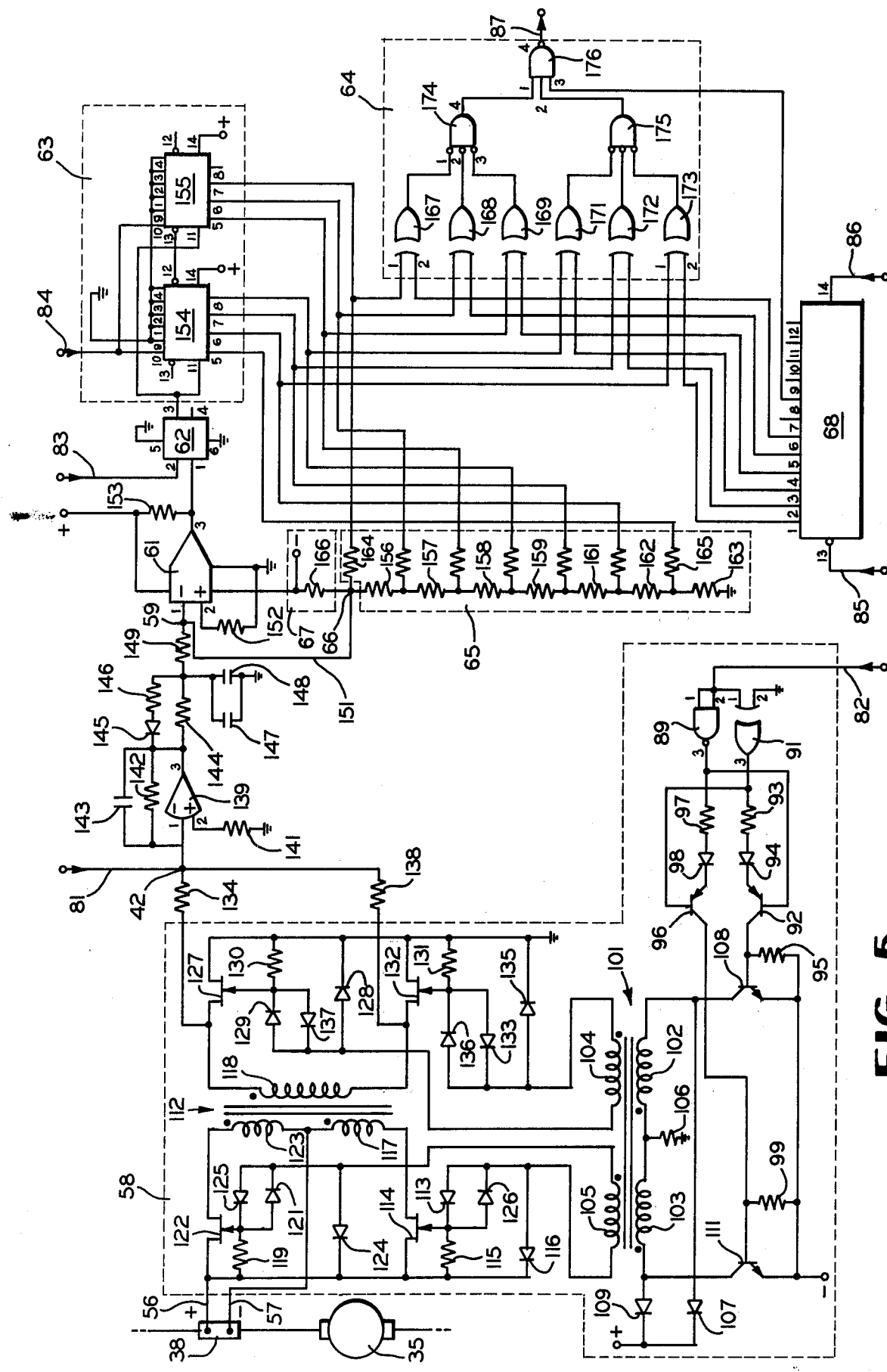
Figure 6:
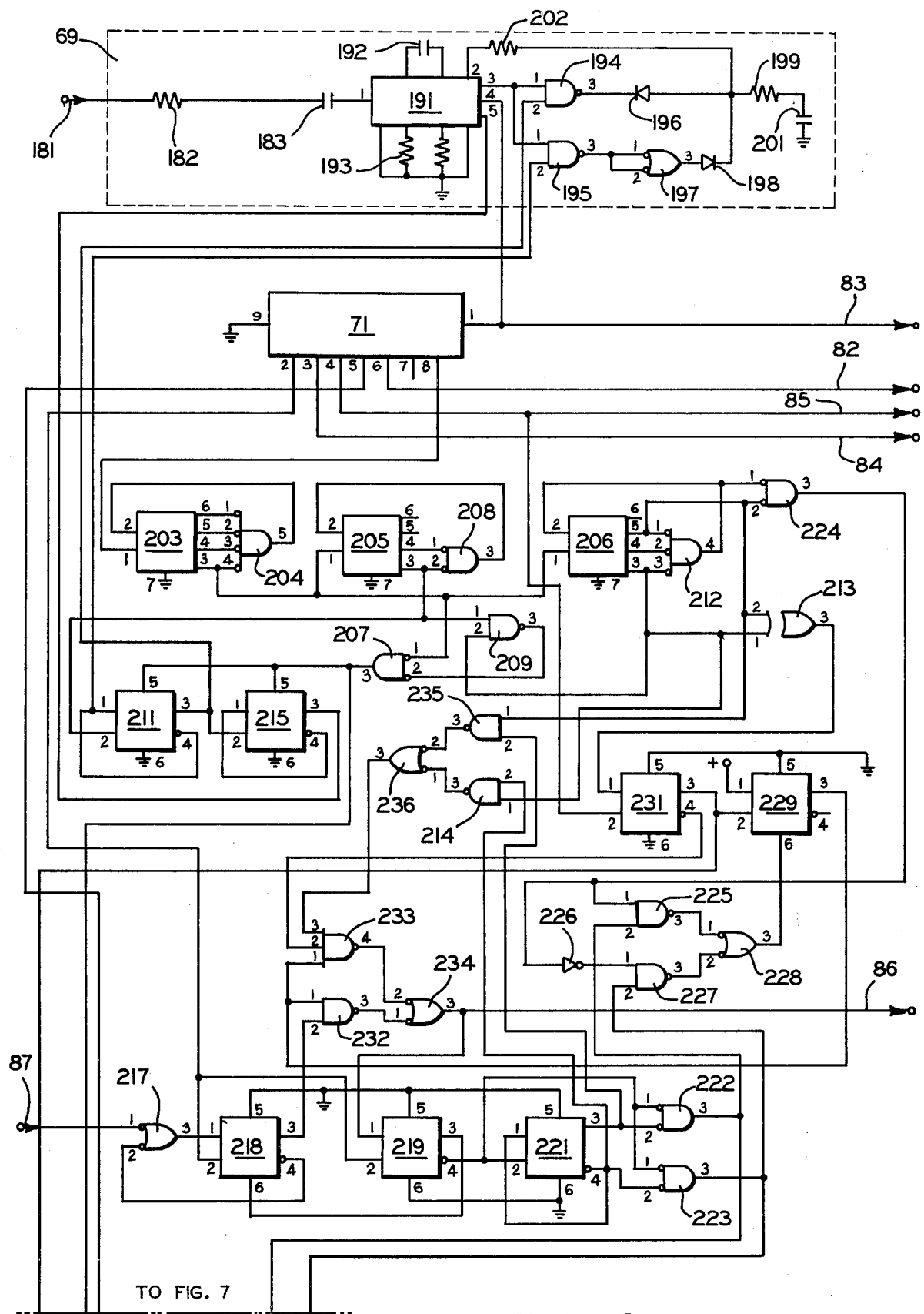

FIGS. 5, 6 and 7 are schematic diagrams of the present invention as included in the motor control system shown in FIG. 4. Referring to FIG. 5, there is shown the motor armature 35, the shunt 38 and a portion of the digital firing control 39. Inputs to FIG. 5 are the armature current command on a line 81, pulse trains from the clock 71 on the lines 82, 83, 84 and 85, and a reset signal on a reset line 86. The outputs from FIG. 5 are the SCR firing commands on a line 87. Referring to FIGS. 6 and 7, there is shown the balance of the digital firing control 39, the SCR gating circuit 41 and the SCR's of the full wave rectifier 36. Inputs to FIGS. 6 and 7 from FIG. 5 are the SCR firing commands on the line 87. Outputs from FIGS. 6 and 7 to FIG. 5 are the pulse trains from the clock 71 on the lines 82, 83, 84 and 85 and the reset signal on the line 86. FIG. 7 also receives as inputs the input lines 53, 54 and 55 from the armature power supply and has an output line 88 for the rectified current from the SCR 76.

In the following explanation of FIGS. 5, 6 and 7, the leads of the circuit elements will be designated by the reference numberal of the element followed by a "$-n$" where "n" is the number of the lead. For example, in FIG. 5, element 89 is a NAND gate having a pair of inputs 89-1 and 89-2 and an output 89-3. In addition, where logic elements are utilized, a positive voltage or true logic signal will be represented as a "1" and a zero or negative voltage or false logic signal will be represented as a "0".

Referring to FIG. 5, there is shown the motor armature 35 connected in series with the shunt 38. The shunt 38 generates a voltage between the lines 56 and 57 which is proportional to the current flowing through the shunt 38 and the motor armature 35. The lines 56 and 57 are the inputs to the direct current transformer 58 which generates the scaled armature current signal. The d. c. transformer 58 isolates the armature current circuit from the firing control circuit, thereby generating a relatively noise free feedback signal representing the magnitude of the armature current. The d. c. transformer converts the direct current signal from the shunt to a square wave having alternating opposite polarity portions which is passed through a transformer and converted back to a direct current signal as the scaled armature current signal. The frequency of the square wave is determined by the frequency of a pulse train which may be generated by a conventional pulse generator or may be received on the line 82 from the clock 71 of FIG. 6. The frequency of the pulse train on the line 82 is a multiple of the "60Hz" line frequency of the armature power supply, typically "14.4 KHz".

The pulse train on the line 82 is formed of alternating "1" and "0" pulses which are the input signals at the inputs 89-1 and 89-2 of the NAND gate 89 and the input 91-1 of the exclusive — OR gate 91. The NAND gate 89 will generate a "0" when both inputs are at "1" and will generate a "1" for all other combinations of inputs. The exclusive-OR gate 91 will generate a "0" when the signals at both inputs are the same and will generate a "1" if the signals at the inputs are different. Since an input 91-2 of the exclusive — OR gate 91 is connected to ground to generate a "0", the exclusive — OR gate 91 will generate a "0" at an output 91-3 when the line 82 is at "0" and will generate a "1" when the line 82 is at "1". The NAND gate 89 will generate a "0" at the output 89-3 when the line 82 is at "1" and will generate a "1" when the line 82 is at "0". Therefore, the pulse train from the exclusive — OR gate 91 will be the same as the pulse train on the line 82 and the pulse train from the NAND gate 89 will be the mirror image of the pulse train on the line 82.

When the output 89-3 is at "1", a positive voltage is applied to a base of a PNP transistor 92. An emitter of the transistor 92 receives a "0" from the exclusive — OR gate 91 through a resistor 93 and a diode 94. A collector of the transistor 92 is connected to a negative voltage power supply (not shown) through a resistor 95. The positive voltage at the base of the transistor 92 back biases the transistor to turn it off. At the same time the "0" from the exclusive — OR gate 91 is applied to a base of a PNF transistor 96. An emitter of the transistor 96 is supplied with a "1" through a resistor 97 and a diode 98 and a collector is connected to a negative voltage power supply (not shown) through a resistor 99. Therefore, the transistor 96 will be turned on to pass current from the NAND gate 89 to the negative voltage power supply. When the output 89-3 is at "0", the transistor 96 is turned off and the transistor 92 is turned on to pass current from the exclusive — OR gate 91 to the negative voltage power supply.

The alternate switching on and off of the transistors 92 and 96 generates a pulse train in the windings of a double bobbin transformer 101 having a pair of primary windings 102 and 103 and a pair of secondary windings 104 and 105. The primary windings 102 and 103 are connected together at one end to ground through a resistor 106. The other end of the winding 102 is connected to a positive voltage power supply (not shown) through a diode 107 and to the negative voltage power supply through a NPN transistor 108. The other end of the primary winding 103 is connected to the positive power supply through a diode 109 and to the negative power supply through a transistor 111. When the line 82 is at "1" to turn on the transistor 92, a positive voltage is placed on the base of the transistor 108 to turn it on. Current will flow from ground through the resistor 106, the primary winding 102 and the transistor 108 to the negative power supply to generate a current pulse in the secondary windings 104 and 105. When the line 82 is at "0" to turn on the transistor 96, a positive voltage is placed on the base of the transistor 111 to turn it on. Current will flow from ground through the resistor 106, the primary winding 103, and the transistor 111 to the negative power supply to generate a current pulse in the secondary windings 104 and 105.

The current pulses generated in the secondary winding 105 are utilized to control the application of the shunt voltage on the lines 56 and 57 to the primary windings of an isolation transformer 112 to generate an alternating current wave form. The current pulses generated in the secondary winding 104 are utilized to control conversion of the alternating current wave form in the secondary winding of the isolation transformer 112 into a direct current wave form representing scaled armature current.

A "1" on the line 82 generates a current pulse having a polarity such that current flows out of the ends of the secondary windings 104 and 105 designated by polarity dots and conversely, a "0" on the line 82 generates a current pulse having a polarity such that current flows into the ends of the secondary windings 104 and 105 designated by polarity dots. When current is flowing into the dotted end of the secondary winding 105, it flows through a diode 113 connected between the winding 105 and a gate of a N-channel field effect transistor (FET) 114 and through a resistor 115 connected between the gate and a drain of the FET 114. Current also flows through a diode 116 connected in parallel with the diode 113 and the resistor 115. The voltage drop across the diode 113 is approximately equal to the voltage drop across the diode 116 so that the gate of the FET 114 is held at a positive voltage only slightly less positive than the voltage at the drain and therefore, the FET 114 turns on. The line 56 is connected to a primary winding 117 of the transformer 112 through the FET 114 and the other end of the winding 117 is connected to the line 57. Therefore, current will flow out of the dotted end of the winding 117 to generate a current pulse in a secondary winding 118 of the transformer 12. Current flowing through the diode 113, the resistor 115 and the diode 116 returns to the winding 105 after flowing through a resistor 119 and a diode 121. The largest portion of the voltage across the winding 105 is dropped across the resistor 119 which is connected between a drain and a gate of a N-channel FET 122. Since the gate of the FET 122 has only the voltage drop across the diode 121 applied to it, the FET 122 will be turned off and no current will flow through a primary winding 123 of the transformer 112.

When current is flowing out of the dotted end of the winding 105, a diode 124 provides a current path in parallel with a diode 125 and the resistor 119 to turn on the FET 122. The current will also flow through the resistor 115 and a diode 126 to turn off the FET 114. The line 56 is then connected to the primary winding 123 of the transformer 112 through the FET 122 and the other end of the winding 123 is connected to the line 57. Therefore, current will flow into the dotted end of the winding 123 to generate a current pulse in the secondary winding 118. The frequency of the current pulses in the secondary winding 118 will be twice the frequency of the pulse train on the line 82 as a current pulse is generated for each "1" and "0" on the line 82.

When the transistor 114 is turned on by a current pulse in the secondary winding 105, a current pulse is also generated in the secondary winding 104 which turns on a N-channel FET 127. Current flows into the dotted end of the winding 104 and through a diode 128 connected in parallel with a diode 129 and a resistor 130. The voltage drop across the diode 129 is approximately equal to the voltage drop across the diode 128 so that a gate of the FET 127, connected between the diode 129 and the resistor 130, is held at a positive voltage only slightly less positive than the voltage at a drain connected to the resistor 130, and therefore, the FET 127 turns on. Current returns to the winding 104 through a resistor 131, connected between a drain and a gate of a FET 132, and a diode 133, connected to the gate of the FET 132. The largest portion of the voltage across the winding 104 is dropped across the resistor 131 and since the gate of the FET 132 has only the voltage drop across the diode 133 applied to it, the FET 132 will be turned off. Therefore, the dotted end of the secondary winding 118 will be connected to ground through the FET 127 and the opposite end of the winding 118 will be connected to the summing point 42 through a resistor 138 to supply the scaled armature current signal.

When the transistor 122 is turned on by a current pulse in the secondary winding 105, a current pulse is also generated in the secondary winding 104 which turns on the FET 132. Current flows out of the dotted end of the winding 104 and through a diode 135 connected in parallel with a diode 136 and the resistor 131. The voltage drop across the diode 136 is approximately equal to the voltage drop across the diode 135 so that the gate of the FET 132 is held at a positive voltage only slightly less positive than the voltage at the drain to turn on the FET 132. Current returns to the winding 104 through the resistor 130 and a diode 137 connected to the gate of the FET 127. The largest portion of the voltage across the winding 104 is dropped across the resistor 130 and since the gate of the FET 127 has only the voltage drop across the diode 137 applied to it, the FET 127 will be turned off. Therefore, the dotted end of the secondary winding 118 will be connected to the summing point 42 through a resistor 134 to supply the scaled armature current signal and the opposite end of the winding 118 will be connected to ground through the FET 132.

In summary, the d. c. transformer 58 receives a direct current voltage representing armature current, on the lines 56 and 57 from the shunt 38, and transforms it into a relatively noise free scaled armature current signal at the summing point 42. A pulse train on the line 82 is utilized to alternately switch on and off a first pair of FET's to generate current pulses of opposite polarity in the primary windings of the transformer 118. A second pair of FET's are responsive to the pulse train to alternately connect the secondary winding of the transformer 118 to the summing point 42 to generate current pulses of like polarity as the scaled armature current signal.

The summing point 42 also receives the armature current command on the line 81 which has subtracted from it the scaled armature current signal to generate the armature current error signal. A reset integrator performs a shaping function by averaging the error signal over the time interval between firing commands so that the control responds to an average difference between the armature current command and the scaled armature current signal. This shaping makes this control faster than conventional controls and also allows it to be utilized to drive various size d. c. motors with only scale changes in the input signals.

The output signal from the summing point 42 is applied to an inverting input 139-1 of an amplifier 139. The amplifier 139 has a non-inverting input 139-2 which is grounded through a resistor 141 and an output 139-3 connected to the input 139-1 by a resistor 142 and a capacitor 143 connected in parallel to eliminate any noise on the input signal provided to the amplifier. The output 139-3 is also connected to a parallel combination of a resistor 144 and a diode 145 in series with a resistor 146. Connected between ground and the junction between the resistors 144 and 146 is a parallel combination of a pair of capacitors 147 and 148. These resistors, the diode, and the capacitors form a reset integrator which averages the armature current error signal.

A change in the output from the amplifier 139 toward a more positive voltage will charge the capacitors 147 and 148 through the resistor 144. A change toward a more negative voltage will discharge the capacitors through the resistor 146 and the diode 145 in parallel with the resistor 144. Since the polarity of the scaled armature current signal with respect to ground is shown as being positive, the polarity of the armature current command signal will be negative. Therefore, if the armature current is to be reduced, the output from the amplifier 139 will have a negative polarity and if the armature current is to be increased, the output will have a positive polarity. Typically, the values of the resistors 144 and 146 and the values of the capacitors 147 and 148 are chosen so that the charging time constant is approximately three times the time interval between firing commands to prevent the control from overshooting and applying too much armature current and the discharge time constant is approximately one third of the time interval between firing commands to permit a relatively quick response to an over current condition.

The resistor 149 and a line 151 are connected at the summing point 59 to generate the $\Delta\alpha$ signal to the input 61-1. The resistor 149 limits the current generated by the $\Delta\alpha$ signal thereby controlling the maximum possible change in the firing angle. The line 151 receives the output from the summing point 66 which receives the offset angle signal from the offset angle generator 67 and $\Delta\alpha$ plus offset angle signal from the digital to analog converter 65. The comparator 61 also has a non-inverting input 61-2 which is connected to ground through a resistor 152 and an output 61-3 which is connected to a positive voltage power source (not shown) through a resistor 153. When the $\Delta\alpha$ signal is negative, the comparator 61 will be turned off so that the positive voltage from the power source (not shown) is applied to an input 62-1 of the enable generator 62 through the resistor 153. When the $\Delta\alpha$ signal is positive, the comparator 61 will be turned on to connect the input 62-1 to ground. The enable generator 62 is a D-type flip flop having an input 62-1, a clock input 62-2, a non-inverting output 62-3, an inverting output 62-4, a set input 62-5 and a reset input 62-6. The signal applied at the input 62-1 will appear at the output 62-3 when the signal applied at the clock input 62-2 changes from "0" to "1". A "1" applied to the set input 62-5 will set the output 62-3 to "1" and a "1" applied to the reset input 62-6 will set the output 62-3 to "0".

Both the set input 62-5 and the reset input 62-6 of the enable generator 62 are grounded so that only the change from "0" to "1" at the clock input 62-2 will generate a change at the output 62-3. When the $\Delta\alpha$ signal is of a positive polarity the output 62-3 will generate a "0" and when the $\Delta\alpha$ signal is of a negative polarity, the output 62-3 will generate a "1" when the generator 62 is clocked by a train of alternating "1" and "0" pulses on the line 83. Therefore, the positive polarity and negative polarity $\Delta\alpha$ signals generate "0" and "1" signals respectively to an up/down input of the X counter 63. The pulse train on the line 83 from the clock pulse generator 71 synchronizes the up/down input of the X counter 63 with the comparator 64 so that there will not be a false count if the output of the comparator 64 changes at the same time the X counter 63 is clocked.

The X counter includes a pair of up/down counters 154 and 155 which are connected in series for counting the duration of the $\alpha\Delta$ signal. The counter 154 has four preset inputs 154-1, 154-2, 154-3 and 154-4 from which signals may be transferred to four outputs 154-5, 154-6, 154-7 and 154-8 when a preset enable input 154-9 receives a "1". When the preset enable input and the preset inputs are connected to ground, as shown, the counter 154 will count once for each time the signal at a clock input 154-10 changes from "0" to "1". The clock input 154-10 receives a train of alternating "0" and "1" pulses on the line 84. Each count will be added to a total if there is a "1" at an up/down input 154-11 or subtracted from a total if there is a "0" at the up/down input 154-11. When the counter 154 reaches the maximum total count or the minimum total count at its outputs 154-5 to 154-8, the next count up or down respectively will set the outputs to "0" and generate a "0" at a carry out output 154-12. If the counter 154 receives a "0" at a carry in input 154-13, it will add or subtract a count from its total count according to the signal present at the up/down input 154-11. When the signal at the clock input 154-9 changes from "0" to "1". Therefore, by connecting the carry out output 154-12 to the carry in input 155-13, the counters 154 and 155 will count clock pulses on the line 84 in the direction indicated by the signal from the generator 62. If a binary decimal input 154-14 receives a "1" from a positive voltage power supply (not shown) the counter 154 will generate a binary count whereas a "0" will generate a decimal count.

Typically, the pulse trains on the lines 83 and 84 are multiples of the "60Hz" line frequency of the armature power supply. The frequency on the line 83 may be "460.8KHz" and the frequency on the line 84 may be "115.2KHz" whereby the least significant bit at 154-5 represents 0.09375° and the most significant bit at 155-7 represents 12° of phase angle. Therefore, the output of the X counter 63 represents a phase angle between a minimum of 0° and a maximum of 23.90625° in binary form. The outputs of the X counter 63 are connected to a digital to analog converter 65 which generates an analog signal to the summing point 66. The converter 65 has seven resistors 156, 157, 158, 159, 161, 162, and 163 connected in series between the summing point 66 and ground. Each of the X counter outputs is connected to a resistor which in turn is connected between a different pair of adjacent resistors from the aforementioned seven resistors. The magnitude of the output of the converter 65 is determined by the total count in the counters 154 and 155 and the number of resistors connected between each output and the summing point 66. The output 155-7 representing 12° is connected to the summing point 66 through a resistor 164 to apply the maximum voltage. The output 154-5 representing 0.1875° is connected to the summing point 66 through a resistor 165 and the resistors 162, 161, 159, 158, 157 and 156 in series to apply the minimum voltage. Since a "1" at any of the outputs of the counters 154 and 155 represents the presence of an accumulated count total, the output from the converter 65 will be of a positive polarity.

The summing point 66 also receives a signal representing an offset angle from an offset angle generator 67. The generator 67 has a resistor 166 connected between a negative voltage power source (not shown) and the summing point 66 to generate a negative polarity 12° offset angle signal. The offset angle presets the X counter at the center of its counting range so that the standard firing interval can be expanded or contracted by 12°. When the control is turned on, the negative polarity offset signal will be applied at the input 61-1 of the comparator 61 to turn it off and apply a "1" to the input 62-1 of the generator 62. The generator 62 will generate a "1" to the X counter to enable it to count up to 12° which places a "1" at the output 155-7. The converter 65 will respond to the "1" at the output 155-7 to generate a positive polarity 12° at the summing point which places a zero signal at the input 61-1. The zero input to the comparator 61 will generate a down count signal from the generator 62 and the counter 63 will count down one bit or 0.1875° to generate a total output of 11.8125°. The signal from the summing point 66 will then become negative and the X counter will be enabled to count up to 12°. As long as there is no $\Delta\alpha$ signal, the X counter will generate an output which will alternate between 11.8125° and 12°.

During the counting cycle of the X counter, the Y counter 68 is receiving a train of alternating "1" and "0" pulses on the line 85. The Y counter is a twelve bit binary counter having binary outputs 68-1 to 68-12 which generate a binary count representing the number of times the signal at a clock input 68-13 has changed from "1" to "0". A "0" at a rest input 68-14 on the line 86 enables the Y counter and a "1" sets all the outputs to "0". The pulse train on the line 85 is a multiple of the "60Hz" frequency of the armature power source and typically is "57.6KHz" or one half of the frequency of the pulse train on the line 84 for the X counter. Therefore, the Y counter requires twice the counting time of the X counter to total the same number of counts and the least significant bit at the output 68-1 will be 0.375° while the bit at the output 68-6 is 12° and the bit at the output 68-8 is 48°.

When the signals at the X counter outputs 154-6 to 155-7 are equal to the signals at the Y counter outputs 68-1 to 68-6 and the output 68-8 is at "1", the comparator 64 will generate an SCR firing command in the form of a "0" on the line 87. If the $\Delta\alpha$ signal is at zero, the X counter output will be equal to the offset angle of 12°. Therefore, the Y counter will count to 12° plus 48° or to 60° between each firing command for normal firing of the SCR's. If the firing angle is to be retarded, the $\Delta\alpha$ signal is added to the totals in the X and Y counters and the SCR firing commands will be spaced apart by 60° + $\Delta\alpha$ to retard the firing angle relative to the zero crossing point of the armature power supply wave form. As the armature current decreases due to the retarded firing angle, the $\Delta\alpha$ signal will be reduced to zero and the SCR firing commands will be generated 60° apart. If the firing angle is to be advanced, the $\Delta\alpha$ signal is subtracted from the totals in the X and Y counters and the SCR firing commands will be spaced apart by 60° − $\Delta\alpha$ to advance the firing angle relative to the zero crossing point of the armature power supply wave form. As the armature current increases due to the advanced firing angle, the $\Delta\alpha$ signal will be reduced to zero and the SCR firing commands will be generated 60° apart.

The comparator 64 includes six exclusive — OR gates 167, 168, 169, 171, 172, and 173 each of which receives the corresponding signals from the X and Y counters. For example, the gate 167 receives the 12° signal from the output 155-7 at an input 167-1 and the 12° signal from the output 68-6 at an input 167-2 to compare the most significant bits. The gate 173 receives the 0.375 signal from the output 154-6 at an input 173-1 and the 0.375° signal from the output 68-2 at an input 173-2 to compare the least significant bit from the Y counter with the next to the least significant bit from the X counter. If the two signals representing corresponding bits at any one of the exclusive —OR gates 167, 168, 169, 171, 172, and 173 are a "1" and a "0", that gate will generate a "1" to one of two NOR gates 174 and 175. Gate 174 is a negative logic NOR gate which generates a "1" at an output 174-4 when all inputs are at "0" and generates a "0" for any other combination of input signals. For example, a "1" at any one or more of the inputs 174-1, 174-2, and 174-3 of the NOR gate 174 will generate a "0" at the output 174-4 to an input 176-1 of a NAND gate 176. The NAND gate 176 will respond to "0" at any one or more of its inputs by generating a "1" on the line 87 which signifies the absence of a SCR firing command.

When each pair of signals at the inputs to the exclusive-OR gates are the same signifying that the X and Y counter totals are equal, all the exclusive—OR gates will generate a "0" to the inputs of the NOR gates 174 and 175 which in turn will generate a "1" at the inputs 176-1 and 176-2 of the NAND gate 176. If the 48° output 68-8 of the Y counter is also at "1", the NAND gate 176 will generate a "0" at the output 176-4 on the line 87 as the SCR firing command. Then the Y counter receives a "1" reset signal on the line 86 to reset its outputs to zero to commence the counting for the next SCR firing command.

Referring to FIG. 6, there is shown the phase locked loop 69 which receives a "60Hz" signal on an input line 181 which is generated from the "60Hz" armature power supply wave forms by a circuit that will be described later. The line 181 is connected to a current limiting resistor 182 and a filter capacitor 183 in series to an input 191-1 of a phase locked loop element 191. The wave form is utilized by the phase locked loop element 191 to generate a pulse train to the clock pulse generator 71 and to the enable generator 62 of FIG. 5 on the line 83. The element 191 can be a type number CD4046A integrated circuit manufactured by the RCA Corporation, Solid State Division, Box 3200, Somerville, N.J. 08876.

The phase locked loop generates a pulse train which is a multiple of the "60Hz" frequency of the armature power supply wave form and is synchronized with that wave form. Therefore, the pulse trains generated by the clock 71 and the pulse trains at the X and Y counters of FIG. 5 are also synchronized with the "60Hz" wave form and each pulse represents a time based angular increment of the wave form cycle. The firing command signals can then be digitally generated utilizing various combinations of these pulse trains with respect to one another to define precise points on each half cycle of the "60Hz" wave form for controlling the current flow.

The phase locked loop element 191 includes a pair of phase comparators (not shown) having a common input 191-1 and a linear voltage-controlled oscillator (not shown) having an input 191-2. If an output 191-3 of the first comparator, an exclusive-OR network, is connected to the oscillator input 191-2 and a low pass filter, and an output 191-4 of the oscillator is connected to an input 191-5 of the first comparator, then the phase locked loop element will generate a pulse train at the output 191-4 which is a multiple of the frequency of the input signal at 191-1 and falls within a frequency range determined by an external capacitor 192 and an external resistor 193. The phase angle between the input signal at 191-1 and the output signal at 191-4 is determined by the magnitude of the input signal at 191-2 and can be varied between 0° at zero input voltage to 180° at the maximum input voltage. The wave form generated at the output 191-4 is frequency divided by the clock pulse generator 71 and several other frequency division elements before being applied as a "60Hz" pulse train at the input 191-5. If the input wave forms at 191-1 and 191-5 are in phase, then the output 191-3 will be at "0" at a pair of inputs 194-1 and 195-1 of a pair of NAND gates 194 and 195 respectively. The NAND gate 194 will generate a "1" from an output 194-3 which is blocked by a diode 196. The NAND gate 195 will also generate a "1" from an output 195-3 which is the input to a pair of inputs 197-1 and 197-2 of a negative logic NAND gate 197. The NAND gate 196 will generate a "0" from an output 197-3 which is blocked by a diode 198 having an anode connected to the output 197-3 and a cathode connected to the junction of a resistor 199, a resistor 202 and the anode of the diode 196 which has its cathode connected to the output 194-3. The resistor 199 is also connected to ground through a capacitor 201. If it is assumed that the capacitor 201 is charged to a voltage having a magnitude sufficient to enable the oscillator to generate the pulse train with a frequency which is a multiple of the frequency of the input signal at 191-1, the element 191 will lock onto that frequency as shown in the wave forms of FIGS. 8A to 8H. The capacitor will remain charged since it is prevented from discharging by the diode 198, the reverse biased diode 196 and the relatively high value of resistance of the resistors 199 and 202 in series.

If the signals at the inputs 191-1 and 191-5 are out of phase and/or at different frequencies, the phase locked loop 69 will compensate to drive the signal at input 191-5 into phase at the frequency of the signal at the input 191-5. The NAND gate 194 will generate "0" error pulses to lower the frequency and the NAND gate 196 will generate "1" error pulses to raise the frequency.

Referring to FIGS. 9A to 9H, there is shown the wave forms generated when the element 191 is not phase locked. The wave form at the input 191-5 lags behind the wave form at the input 191-1 by approximately 45° so that the first comparator generates the wave form shown in FIG. 9C at the output 191-3. The wave forms shown in FIG. 9D and FIG. 9F are generated from the pulse train from the output 191-4 and therefore are in phase with the wave form in FIG. 9B. The output from the NAND gate 194 at 194-3 in FIG. 9E does not change but the output from NAND gate 195 at 195-3 in FIG. 9G has "0" pulses formed therein which correspond to the "1" pulses from the output 191-3. The "0" pulses generate "1" pulses from the NAND gate 197 at 197-3 which are passed by the diode 198 to a resistor 199 and a capacitor 201 connected in series to ground. The resistor 199 and the capacitor 201 comprise a low pass filter which averages the output pulse from the NAND gate 197 and supplies the average voltage through a resistor 202 to the input 191-2. The "1" pulses at 197-3 increase the voltage applied to the input 191-2 which in turn increases the frequency of the pulse train at 191-5 shown in FIG. 9B. The increase in the frequency will tend to shift the pulses toward the leading edge of the pulses of the pulse train in FIG. 8A until the pulse trains are synchronized as shown in FIGS. 8A and 8B. If the pulse train of FIG. 8B leads the pulse train shown in FIG. 8A, a series of "0" pulses are generated at the output 194-3 to reduce the voltage applied at the input 191-2 thereby reducing the frequency of the pulse train at the input 191-5. The decrease in frequency will tend to shift the pulses at the input 191-5 toward the leading edge of the pulses of the pulse train at the input 191-1 until the pulse trains are synchronized as shown in FIGS. 8A and 8B.

The output from the phase locked loop 69 is applied as a "460.8KHz" pulse train to the line 83 and the input 71-1 of the clock 71. The clock 71 is a seven stage binary counter which frequency divides the pulse train from the loop 69 at its outputs 71-2 to 71-8 by integer multiples of two. A reset input 71-9 is grounded to enable the counter 71. The pulse train at the output 71-3 is divided by $2^2$ or "4" for a "115.2KHz" frequency on the line 84, is divided by $2^3$ or "8" at the output 71-4 for a "57.6KHz" frequency on the line 85 and is divided by $2^5$ or "32" at the output 71-6 for a "14.4KHz" frequency on the line 82.

The pulse train at the output 71-8 is divided by $2^7$ or "128" for a "3.6KHz" frequency and is further divided to generate the pulse trains at the input 191-5, the input 194-2 and the input 195-2. The output 71-8 is connected to a clock input 203-1 of a four bit static shift register 203. A signal at a data input 203-2 is entered into the shift register and stored at an output 203-3. The signal can be shifted in sequence to the outputs 203-4, 203-5 and 203-6, one shift for each time the signal at the clock input 203-1 changes from "0" to "1". A reset input 203-7 is connected to ground to enable the shift register 203. The outputs 203-3 to 203-6 are connected to four inputs 204-1 to 204-4 of a negative logic NOR gate 204 which has an output 204-5 connected to the input 203-2. Assuming that the outputs 203-3 to 203-6 are at "0", the output 204-5 will be at "1". The first "0" to "1" transition at 203-1 will enter a "1" at the output 203-3 and change the output 204-5 to "0". Four more "0" to "1" transitions will clock the "1" through the shift register 203 and return all the outputs to "0" to generate a "1" at output 204-5. Therefore, the pulse train at the input 203-1 is divided by a factor of five at the output 203-3 to generate a pulse train having a frequency of "720Hz", as shown in FIG. 10A, to an input 205-1 of a shift register 205, an input 206-1 of a shift register 206, and an input 207-1 of a NOR gate 207.

The shift register 205 has a pair of outputs 205-3 and 205-4 connected to a pair of inputs 208-1 and 208-2 of a NOR gate 208. An output 208-3 of the NOR 208 is connected to an input 205-2 of the shift register to perform a division by a factor of three at the output 205-3 to generate a pulse train having a frequency of "240Hz", as shown in FIG. 10B, to an input 209-1 of a NAND gate 209 and a clock input 211-2 of a D-type flip-flop 211. The shift register 206 has three outputs 206-3, 206-4 and 206-5 which are connected to three inputs 212-1, 212-2 and 212-3 of a NOR gate 212. An output 212-4 of the NOR 212 is connected to an input 206-2 of the shift register to perform a division by a factor of four at the output 206-3 to generate a pulse train having a frequency of "180Hz", as shown in FIG. 10C, to an input 209-2 of the NAND gate 209, an input 213-1 of an exclusive — OR gate 213, and an input 214-1 of a NAND gate 214.

Figure 10:
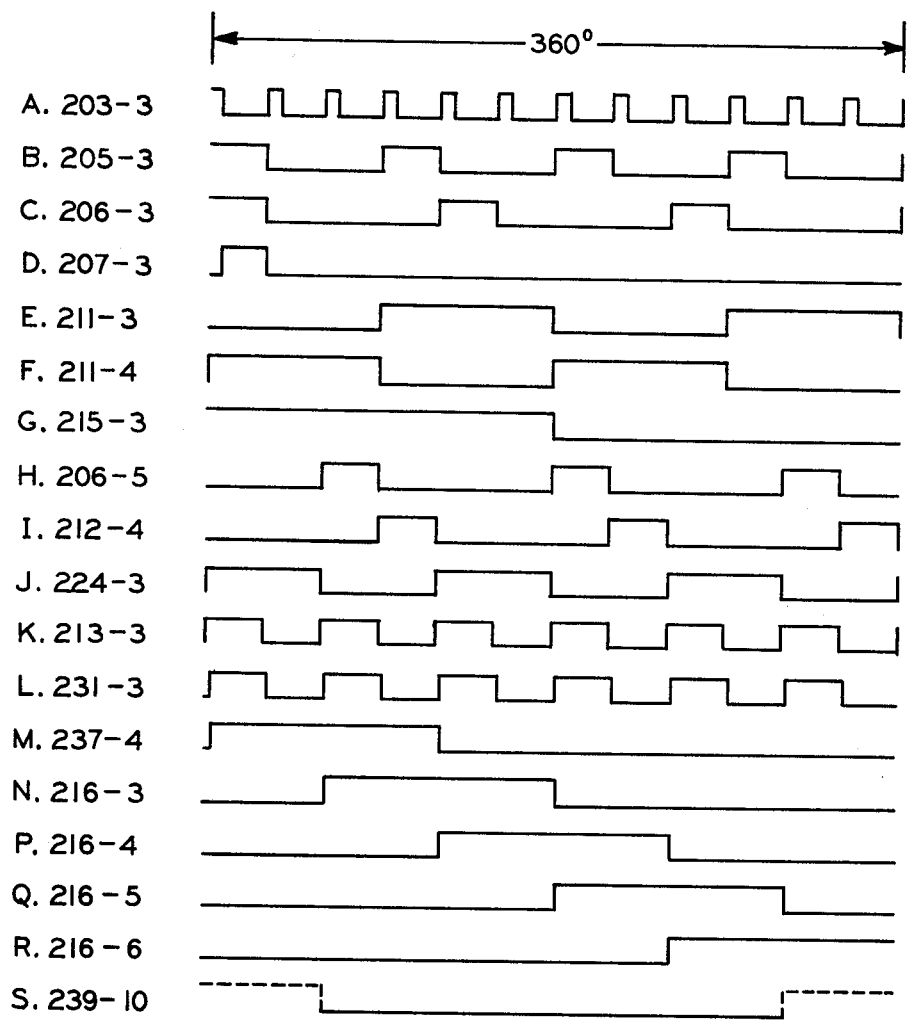

FIG. 10 shows portions of the pulse trains generated by the circuit elements of FIGS. 6 and 7 for one cycle or 360° of the armature power supply wave form. Therefore, the pulse trains shown will be repeated for each power supply cycle. The NAND gate 209 receives the pulse trains shown in FIGS. 10B and 10C to generate a "0" when both pulse trains are at "1" for the first 30° and to generate a "1" for the remaining 330° of the power supply cycle. The signal at an output 209-3 of the NAND gate 209 is received at an input 207-2 of the NOR gate 207 and, together with the pulse train from the output 203-3 of FIG. 10A at the input 207-1, generates the signal shown in FIG. 10D as a "1" pulse of 24° duration displaced 6° from the start of the power source cycle at an output 207-3. The signal of FIG. 10D is utilized to set a pair of D-type flip flops 211 and 215 at a pair of set inputs 211-5 and 215-5 respectively, and to reset a four bit shift register 216 of FIG. 7 at a reset input 216-7.

The flip flop 211 has an input 211-1 connected to an inverting output 211-4 and is enabled by a "0" at a reset input 211-6 connected to ground. A non-inverting output 211-3 is set to "0" and the inverting output 211-4 is set to "1" by the "1" at the set input 211-5. The "1" from the output 211-4 is present at the input 211-1 when the flip flop 211 is clocked by a "0" to "1" transition at the clock input 211-2 as shown in FIG. 10B to change the output 211-4 to "0" and the output 211-3 to "1". Therefore, the flip flop 211 divides the pulse train at the output 205-3 by a factor of two to generate a pair of pulse trains having "120Hz" frequencies at the outputs 211-3, shown in FIG. 10E, and 211-4, shown in FIG. 10F. The pulse trains of FIGS. 10E and 10F are the signals at the inputs 194-2, shown in FIG. 8D, and 195-2, shown in FIG. 8F.

The output 211-3 is also connected to a clock input 215-2 of the flip flop 215 which is enabled by a "0" at a reset input 215-6 which is connected to ground. The flip flop 215 has an inverting output 215-4 connected to an input 215-1 for dividing the pulse train at the clock input 215-2 by a factor of two at a non-inverting output 215-3 as shown in FIG. 10G. The wave form shown in FIG. 10G is applied at the input 191-5 of the phase locked loop element 191 and has a "60Hz" frequency which is in phase with the "60Hz" input signal at the input 191-1 as shown in FIGS. 8A and 8B.

The wave form at the output 206-3 and the wave form at the output 206-5, as shown in FIGS. 10C and 10H, are utilized to generate the reset signal on the line 86 to the Y counter 68 of FIG. 5. Each time a firing command is generated by the comparator 64 on the line 87, the signal at an input 217-1 of a negative logic NAND gate 217 changes from "1" to "0". An input 217-2 is connected to a non-inverting output 218-4 of a D-type flip flop 218 and, assuming that the flipflop has been reset, there will be a "1" at the input 217-2. An output 217-3 of the NAND gate 217 is connected to an input 218-1 and a clock input 218-2 receives the "230.4KHz" pulse train from the output 71-2 of the clock 71. The flip flop 218 is enabled by a "0" at a set input 218-5 which is connected to ground and when the signal at the input 217-1 changes from "1" to "0" the input 218-1 receives a "1" from the output 217-3. A "0" to "1" transition at the clock input 218-2 will place a "0" at the output 218-4 and the input 217-2 and a "1" at an output 218-3. A reset input 218-6 is connected to a non-inverting output 291-3 of a D-type flip flop 219 which is enabled by a "0" at a set input 219-5 and a reset input 219-6 which are connected to ground. The flip flop 219 receives the reset signal on the line 86 at an input 219-1 and the "230.4KHz" signal at a clock input 219-2. When a "1" reset signal is generated, a "0" to "1" transition at the clock input 219-2 will change an inverting output 219-4 to "0" and the output 219-3 to "1" to reseet the flip flop 218 at the reset input 218-6. When the flip flop 218 is reset, the output 218-4 changes from "0" to "1" to enable the NAND gate 217 as was previously assumed. The line 87 will return to "1" to generate "0" from the output 217-3 which maintains the flip flop 218 in the reset state as clock pulses are received at the clock input 218-2 until the next firing command is received.

The output 219-4 is connected to a clock input 221-2 of a D-type flip flop 221 which is enabled by a "0" at a set input 221-5 and at a reset input 221-6 which are connected to ground. An inverting output 221-4 is connected to an input 221-1 so that each time the reset line 86 changes from "1" to "0" the flip flop 221 will be clocked by a "0" to "1" transition at the clock input 221-2 to alternately generate a "1" at a non-inverting output 221-3 and the output 221-4. The output 219-4 is also connected to a pair of inputs 222-1 and 223-1 of a pair of NOR gates 222 and 223 respectively. The output 221-3 is connected to an input 222-2 of the NOR gate 222 to generate a "1" at an output 222-3 every other time the line 86 goes to "1". The output 221-4 is connected to an input 223-2 of the NOR gate 223 to generate a "1" at an output 223-3 which alternates with the "1" at the output 222-3 when the line 86 goes o "1".

The output 212-4 of the NOR gate 212 will be "1" when the outputs 206-3, 206-4, and 206-5 are at "0" as shown in FIG. 10I. The output 212-4 is connected to an input 224-1 of a NOR gate 224 and the output 206-5 is connected to an input 224-2 to generate the pulse train shown in FIG. 10J at an output 224-3 of the NOR gate 224. The pulse train of FIG. 10J is received at an input 225-1 of a NAND gate 225 and also is inverted by an inverter 226 which changes a "1" to a "0" and a "0" to a "1" at an input 227-1 of a NAND gate 227. An input 225-2 receives the pulse train from the output 222-3 and an input 227-2 receives the pulse train from the output 223-3 to alternately generate a "0" to one of a pair of inputs 228-1 and 228-2 of an NAND gate 228 each time a "1" reset signal is generated on the line 86. A "0" at either of the inputs of the NAND gate 228 will generate a "1" at an output 228-3 to a reset input 229-6 of a D-type flip flop 229 to reset a non-inverting output 229-3 to "0".

The exclusive -13 OR 213 receives the pulse train shown in FIG. 10H at an input 213-2 and the pulse train shown in FIG. 10C at the input 213-1 to generate the pulse train shown in FIG. 10K at an output 213-3 which is connected to an input 231-1 of a D-type flip flop 231. The flip flop 231 is enabled by a "0" at a set input 231-5 and at a reset input 231-6 which are connected to ground. A clock input 231-2 receives a "57.6KHz" pulse train from the output 71-4 of the clock 71 to generate the pulse train shown in FIG. 10L at a noninverting output 231-3 and the inverse at an inverting output 231-4. Since the outputs of the counter 71 go to "1" only on the transition from "1" to "0" at the input 71-1, the start of each "1" pulse of the pulse train in FIG. 10L will be delayed from the start of each "1" pulse of the pulse train in FIG. 10K by the duration of a "1" pulse from the pulse train at the output 71-4. The output 231-3 is connected to a clock input 229-2 of the flip flop 229 which also has an input 229-1 connected to a positive voltage power source (not shown). Therefore, the flip flop 229 will be clocked at the clock input 229-2 by the first "1" pulse of the wave form of FIG. 10L to generate a "1" at the output 229-3 and will be reset at the input 229-6 by the output at 228-3 to generate a "0". The flip flop 229 is enabled by a "0" at a set input 229-5 which is connected to ground.

Figure 11:
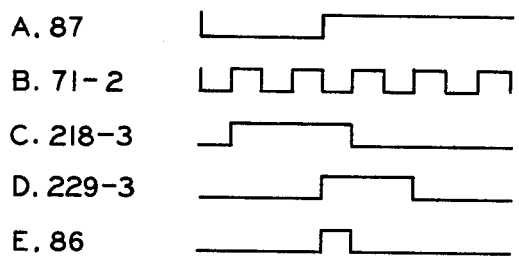

The output 229-3 is connected to an input 232-1 of a NAND gate 232 and to an input 233-1 of a NAND gate 233. An input 232-2 of the NAND gate 232 is connected to a non-inverting output 218-3 of the flip flop 218 to generate a "0" at an output 232-3. The output 232-3 is connected to an input 234-1 of a NAND gate 234 which generates a "1" reset signal at an output 234-3 on the line 86 in response to a "0" at the input 234-1. Referring to FIG. 11, there is shown in FIG. 11A a "0" firing command signal on the line 87 and the pulse train from the output 71-2 of the clock 71 in FIG. 11B which generate a "1" pulse at the output 218-3 of the flip flop 218 as shown in FIG. 11C. The signal at the output 218-3 and the signal from the output 229-3 of the flip flop 229, shown in FIG. 11D, generate a "1" reset signal on the line 86 as shown in FIG. 11E.

The output 211-4 is connected to an input 214-2 and the output 206-3 is connected to the input 214-1 of the NAND gate 214. The output 206-5 is connected to an input 235-1 and the output 221-3 is connected to an input 235-2 of a NAND gate 235. When both inputs to either NAND gate 214 or NAND gate 235 are at "1", a "0" is generated at an output 214-3 or 235-3 respectively to either an input 236-1 or an input 236-2 respectively of a NAND gate 236. The NAND gate 236 will generate a "1" at an output 236-3 to an input 233-3 of the NAND gate 233. The output 231-4 of the flip flop 231 is connected to an input 233-2 of the NAND gate 233. When all the inputs are at "1", the NAND gate 233 will generate a "0" at an output 233-4 to an input 234-2 to generate a "1" reset signal on the line 86.

The output 231-3 of the flip flop 231 is connected to a clock input 216-1 of the shift register 216 of FIG. 7. The shift register 216 generates a series of gating pulses having a duration of 120° which are entered into a pair of latches by the SCR firing commands. Three outputs 216-4, 216-5, and 216-6 are connected to three inputs 237-1, 237-2, and 237-3 respectively of a NAND gate 237. An output 237-4 is connected to an input 237-2 and the reset input 216-7 is connected to the output 207-3 of the NOR gate 207 of FIG. 6. Assuming that all the outputs of the shift register 216 are at "0", the output 237-4 will be at "1" as shown in FIG. 10M. The second "0" to "1" transition from the output 231-3 at the clock input 216-1, as shown in FIG. 10L, will generate a "1" at an output 216-3, as shown in FIG. 10N. The third "0" to "1" transition will shift the "1" from the output 216-3 to the output 216-4, as shown in FIG. 10P and will generate a "1" at the output 216-3 as shown in FIG. 10N. the "1" at the output 216-4 is present at the input 237-1 to generate a "0" at the output 237-4 as shown in FIG. 10M. The fourth "0" to "1" transition will shift the "1" signals to the outputs 216-5 and 216-4 as shown in the FIGS. 10Q and 10P respectively, and generate a "0" at the output 216-3 as shown in FIG. 10N. The fifth "0" to "1" transition will shift the "1" signals to the outputs 216-6 and 216-5, as shown in FIGS. 10R and 10Q respectively, will shift the "0" signal to the output 216-4, as shown in FIG. 10P, and generate a "0" at the output 216-3 as shown in FIG. 10N. The sixth "0" to "1" transition will shift the "1" signal to the output 216-6 as shown in FIG. 10R, will shift the "0" signals to the outputs 216-5 and 216-4 respectively, as shown in FIGS. 10Q and 10P, and generate a "0" at the output 216-3 as shown in FIG. 10N. The next "0" to "1" transition occurs at the start of a new cycle as did the first "0" to "1" transition to shift the "0" signals to the outputs 216-6, 216-5, and 216-4 respectively, as shown in FIGS. 10R, 10Q, and 10P, and generate a "0" at the output 216-3 as shown in FIG. 10N. The NAND gate 237 will generate a "1" as shown in FIG. 10M and the cycle is repeated.

The outputs from the shift register 216 and the NAND gate 237 are the inputs to a pair of latches 238 and 239. The latch 238 has a clock input 238-1 which is connected to the output 222-3 of the NOR gate 222. A polarity input 238-2 is connected to a positive voltage power supply (not shown) so that data at the input is transferred to the outputs at a "1" to "0" transition at the clock input 238-1. The latch 239 has a clock input 239-1 which is connected to the output 223-3 of the NOR gate 223 and has a polarity input 239-2 connected to a positive voltage power supply (not shown). The output 216-3 is connected to an input 239-3, the output 216-4 is connected to an input 238-4, the output 216-5 is connected to an input 239-4, the output 216-6 is connected to an input 238-5, and the output 237-4 is connected to an input 238-3. The inputs 238-6 and 239-6 are not used and are connected to ground. Each time a SCR firing command is generated on the line 87, one of the latches 238 and 239 has the data at its inputs latched at its outputs. The data at the input 238-5 will be latched onto a non-inverting output 238-7 which is connected to an input 239-5 of the latch 239. Since the firing commands are 60° apart, the wave form shown in FIG. 10R will be delayed 60° before being latched at an inverting output 239-10 as shown in FIG. 10S. The wave form at the output 239-10 is shown as a dashed line since its duration depends upon the point at which the SCR firing command is generated.

The inverting outputs 238-8, 238-9, 238-10, 239-8, 239-9, and 239-10, of the latches are connected to inputs 241-1, 242-1, 243-1, 244-1, 245-1 and 246-1 of NOR gates 241, 242, 243, 244, 245 and 246 respectively. An output 71-5 of the clock 71, having a pulse train of "28.8KHz", is connected to inputs 241-2, 242-2, 243-2, 244-2, 245-2 and 246-2 in parallel. When the latch output signal and the clock pulse train are both at "0" at one of the NOR gates, that gate is enabled to generate a "1" to the one of the gating circuits, 247, 248, 249, 251, 252 and 253, to which is connected. For example, the NOR gate 241 will generate a "1" from an output 241-3 through a resistor 254 and a diode 255 to the collector of a transistor 256. The transistor 256 has an emitter connected to a negative voltage power supply (not shown) through a resistor 257 and also has a base connected to a positive voltage power supply (not whown) through a resistor 258. The "1" at the collector will turn on the transistor 256 to apply a more positive voltage at a base of a transistor 259. The transistor 259 has a collector connected to a collector of a transistor 261 and an emitter connected to a base of the transistor 261 in a Darlington configuration for increased current amplification. The emitter of the transistor 259 is connected to the emitter of the transistor 261 through a resistor 262 and the resistor 262 and the emitter of the transistor 261 are connected to the negative voltage power supply (not shown). When the transistors 259 and 261 are turned on, current will flow from the ground through a primary winding of a transformer 263, through a resistor 264, and through the transistors 259 and 261 to the negative voltage power supply. The turning on of the Darlington pair will generate a current pulse in a secondary winding of the transformer 263, through a diode 265, to a gate of the SCR 76. The SCR 76 will turn on to pass current from the input line 53 to the output line 88 and to the motor armature.

The primary winding of the transfomer 263 and the resistor 264 are connected to the anode of a diode 266 which has a cathode connected to a positive voltage power source (not shown). The diode 266 provides a discharge path for the field that is built up in the primary winding of the transformer to reduce the time required for the field to collapse.

A pair of leads, 267 and 268, which connect the opposite ends of the primary winding of the transformer 263 to ground and to the resistor 264 respectively, pass through an opening in a balun coil 269. The balun coil 269 prevents any noise which might be present in the system from reaching the gate of the SCR 76 and turning it on out of the predetermined firing sequence.

Each of the gating circuits 248, 249, 251, 252, and 253 includes a transistor similar to the transistor 256 of the gating circuit 247. Each of the transistors has a base which is connected to the resistor 258 and one side of a normally open switch 271. The other side of the normally open switch 271 is connected to ground so that when the switch 271 is closed, the transistors in the gating circuits will be turned off and no SCR will be fired even though the firing command signals are being generated. Therefore, when the present invention is first turned on, the switch 271 will be closed unitl it is determined that the armature power supply is connected to the input lines 53, 54 and 55 in the correct phase relationship so as to protect the circuit components from damage.

Figure 12:
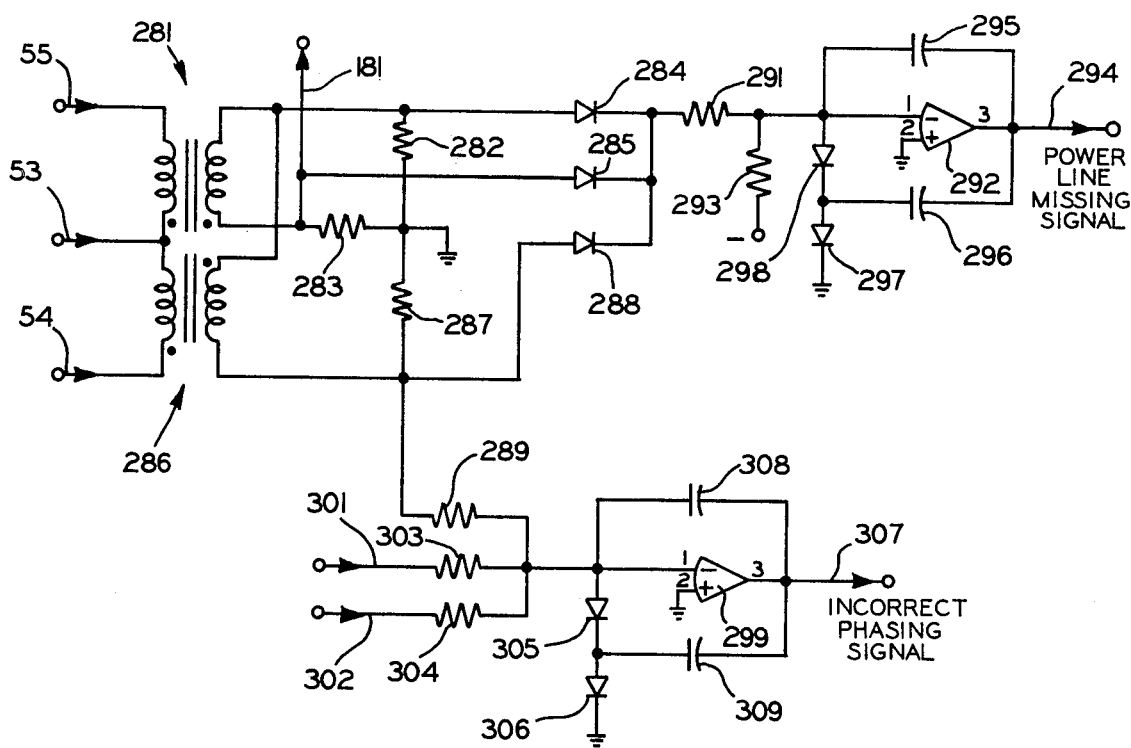
FIG. 12 is a schematic diagram of the input circuit for the phase locked loop, the incorrect phase detection circuit, and the power line missing detection circuit according to the present invention.
Figure 13:
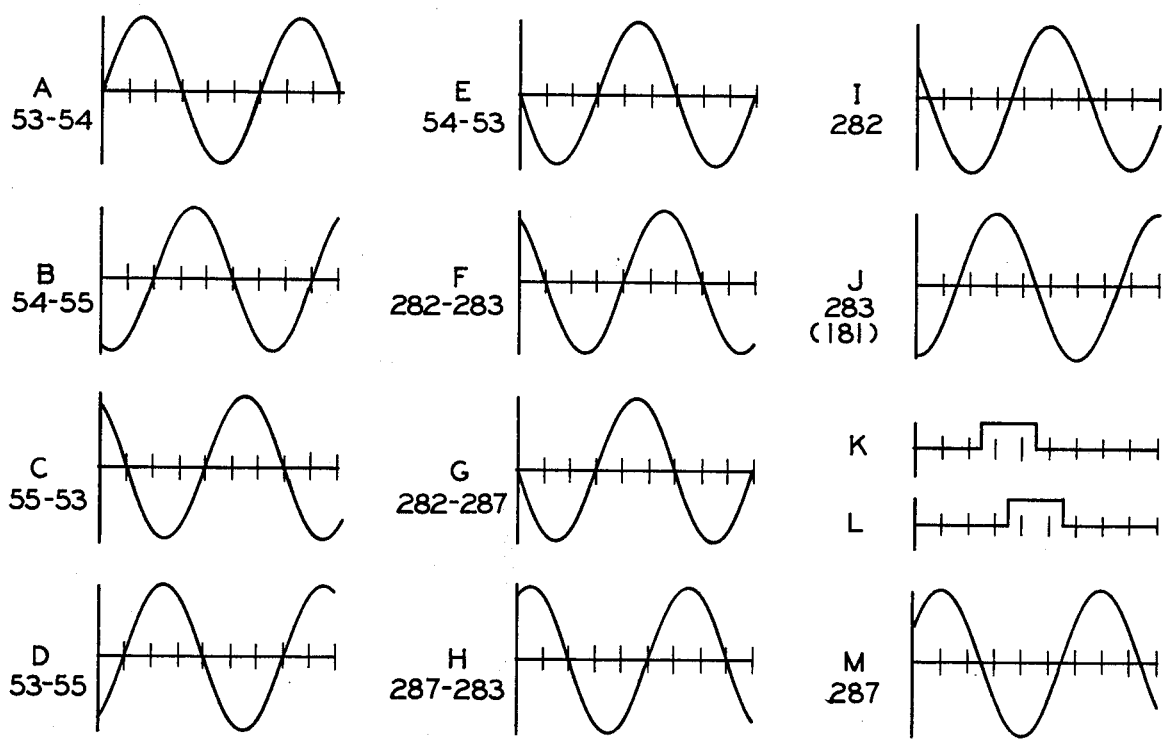
FIG. 13 shows various wave forms generated in the circuits of FIG. 12.

Referring to FIGS. 12 and 13, there is shown a schematic diagram ofthe input circuit for the phase locked loop 69 of FIG. 6 and the various wave forms associated with it. The input wave form generated on the line 181 has a "60Hz" frequency and is 90° out of phase with the voltage applied to the lines 53-54. The input circuit also includes a power line missing detector for indicating that one or more of the lines 53, 54, and 55 are not connected to the armature power supply and an incorrect phasing detector for indicating that one or more of the lines 53, 54, and 55 are incorrectly connected to the armature power supply.

Voltage from a three-phase alternating current power supply is applied to the input lines 53, 54, and 55. If the voltage phase applied to the lines 53-54 is utilized as a reference, as shown in FIG. 13A, the voltage phase applied to the lines 54-55 will lag by 120°, as shown in FIG. 13B, and the voltage applied to the lines 55-53 will lag by 240°, as shown in FIG. 13C, the voltage applied to the lines 53-54. FIG. 13D shows the inverse of the voltage applied to the lines 55-53 which lags by 60° the voltage applied to the lines 53-54 and FIG. 13E shows the inverse of the voltage applied to the lines 53-54 which lags by 180° the voltage applied to the lines 53-54.

The input lines 53 and 55 are connected to the primary winding of a transformer 281 which has both ends of secondary winding connected to ground through a pair of resistors 282 and 283. The end of the secondary winding of the transformer 281 that is connected to the resistor 282 is also connected to the anode of a diode 284. The other end of the secondary winding which is connected to the resistor 283 is also connected to the anode of a diode 285. The input lines 53 and 54 are connected to the primary winding of a transformer 286 which has one end of a secondary winding connected to ground through a resistor 287 and the other end connected to the junction of the resistor 282, the diode 284, and the one end of the secondary winding of the transformer 281. The end of the secondary winding of the transformer 286 connected to the resistor 287 is also connected to the anode of a diode 288 and a resistor 289.

The voltage developed in the secondary winding of the transformer 281, as shown in FIG. 13D, is applied across the resistors 282 and 283 to generate the wave form shown in FIG. 13F. The voltage developed in the secondary winding of the transformer 286, as shown in FIG. 13E, is applied across the resistors 282 and 287 to generate the wave form shown in FIG. 13G. The secondary windings of the transformers 281 and 286 are connected in series across the resistors 287 and 283 to generate the wave form shown in FIG. 13H. If the resistors 282, 283, and 287 are equal in value, the two wave forms applied to each resistor will add to generate new wave forms further shifted relative to the voltage applied to the inputs 53-54. For example, the voltage developed across the resistor 282 with reference to ground has a first component from the secondary winding of the transformer 281, as shown in FIG. 13F, and a second component from the secondary winding of the transformer 286, as shown in FIG. 13G, which generate the wave form shown in FIG. 13I. The voltage developed across the resistor 283 with reference to ground has a first component from the secondary winding of the transformer 281, as shown in FIG. 13F, and a second component from the series connection of the two secondary windings, as shown in FIG. 13H, which generate the wave form shown in FIG. 13J.

The input line 181 to the phase locked loop 69 of FIG. 6 is connected to the junction of the resistor 283, the diode 285 and the one end of the secondary winding of the transformer 281. The wave form of FIG. 13J lags the wave form applied to the input lines 53-54 by 90°. The voltage developed across the resistor 287 with reference to ground has a first component from the secondary winding of the transformer 286, as shown in FIG. 13G, and a second component from the series connection of the two secondary windings, as shown in FIG. 13H, which generate the wave form shown in FIG. 13M.

The power line missing detector receives the positive half cycles of the voltage wave forms shown in FIGS. 13I, 13J, and 13M and adds them to a negative polarity direct current signal. If one or more of the half cycles are missing, the negative polarity direct current signal will be inverted to generate a power line missing signal.

The voltages across the resistors 282, 283, and 287 are 120° out of phase and are half wave rectified by the diodes 284, 285, and 288. The diodes 284, 285, and 288 have their cathodes connected together to a resistor 291 which in turn is connected to the inverting input 292-1 of an ampifier 292. Also connected to the inverting input 292-1 through a resistor 293 is a negative voltage power supply (not shown). The magnitudes of the voltages and the values of the resistors 291 and 293 can be adjusted to generate a zero input voltage at the input 292-1. The amplifier 292 has a non-inverting input 292-2 connected to ground and an output 292-3 connected to a power line missing output line 294.

If all of the phases are present at the input lines 53, 54, and 55, the amplifier 292 will generate a zero output on the line 294 to indicate that condition. If one of the phases is lost, the corresponding half wave rectified voltage will not appear at the input 292-1 during which time the negative voltage from the negative voltage power supply is present to generate a positive voltage from the output 292-3 on the line 294 to indicate a power line missing condition. A capacitor 295 is connected between the input 292-1 and the output 292-3 and has a relatively small value of capacitance which permits it to charge quickly to the positive voltage at the output 292-3. A capacitor 296 is connected in series with a diode 297 between the output 292 and ground. If the capacitor 296 has a relatively large value of capacitance and therefore a relatively large charging time constant as compared with the capacitor 295, the capacitor 296 will charge toward an average positive voltage level on the line 294 in a series of sawtooth steps to maintain the power line missing signal. A diode 298 is connected between the input 292-1 and the diode 297 to provide a shunt path to ground for any positive voltage which is passed by the diodes 284, 285, and 288 and exceeds the magnitude of the negative voltage of the power supply connected to the resistor 293.

The incorrect phasing detector receives the voltage wave form shown in FIG. 13M and adds the negative half cycles to a pair of positive polarity gating pulses developed from the pulse train generated by the phase lock loop 69. If the input voltage phases are not correctly connected, the positive polarity gating pulses of FIGS. 13K and 13L will be displaced from the negative half cycle which will be inverted to generate an incorrect phasing signal.

The voltage across the resistor 287, as shown in FIG. 13M, is applied to an inverting input 299-1 of an amplifier 299 through the resistor 289. The negative half cycle of this wave form begins at the leading edge of the 120° gating pulse on the line 301 from the output 239-8 of the latch 239 of FIG. 7 as shown in FIG. 13K. The end of the negative half cycle occurs at the trailing edge of the 120° gating pulse on the line 302 from the output 238-9 of FIG. 7 as shown in FIG. 13L. The lines 301 and 302 are connected to the input 299-1 by a pair of resistors 303 and 304 respectively. During the positive half cycle of the wave form of FIG. 13M, the voltage is shunted to ground through a pair of diodes 305 and 306 connected in series to the input 299-1 to generate a zero output on the phasing incorrect output line 307. During the negative half cycle of the wave form of FIG. 13M, the positive voltages of FIGS. 13K and 13L cancel the negative voltage of FIG. 13M to generate a zero output on the line 307. Therefore, a zero output on the line 307 indicates that the voltage phases are correctly connected to the input lines 53, 54, and 55.

If the voltage phases are not correctly connected to the input lines, the wave forms of FIGS. 13K and 13L will be displaced from the negative half cycle of the wave form of FIG. 13M to place of portion of the negative voltage at the input 299-1. A non-inverting input 299-2 is connected to ground so that the negative voltage at the input 299-1 generates a positive voltage at the output 299-3 on the line 307 to indicate an incorrect phasing condition. A capacitor 308 is connected between the input 299-1 and the output 299-3 and has a relatively small value of capacitance which permits it to charge quickly to the positive voltage at the output 299-3. A capacitor 309 is connected between the output 299-3 and the junction of the diodes 305 and 306. If the capacitor 309 has a relatively large value of capacitance and therefore a relatively large charging time constant as compared with the capacitor 308, the capacitor 309 will charge toward an average positive voltage level on the line 307 in a series of sawtooth steps to maintain the incorrect phasing signal.

In summary, the present invention concerns a digital firing control for generating firing commands to two or more triggerable switches wherein the switches are to be fired in a predetermined time relationship to one another. The control can be utilized to generate firing signals to the gates of SCR's in a converter for controlling the current flow in the armature of a motor. In its preferred embodiment, the present invention is responsive to a signal representing a desired change in current flow which is generated by subtracting a scaled armature current signal from an armature current command. The digital firing control responds to the change signal by changing the time interval between the previously generated firing command and the next firing command to be generated so as to effect the desired change in current flow.

The digital firing control includes a first binary counter which accumulates a binary count representing the desired change in the firing angle for the SCR's. At the same time, a second binary counter accumulates a binary count representing the phase angle or time interval since the previous firing command was generated. The outputs of the two counters are compared so that when the output of the second counter is equal to the desired change in the first counter plus a predetermined phase angle a firing command is generated. If no change is required, the firing command is generated when the second counter accumulates a binary count representing the predetermined phase angle. Therefore, each firing command is referenced from the previous firing command and not from a point on the input voltage wave form. In the case of a three-phase full wave rectified converter, the predetermined phase angle is 60°.

The counters accumulate count pulses which represent angular increments of the input voltage wave form. The count pulses are generated by a phase locked loop which derives the pulse train from one of the input voltage phases. The scaled armature current signal is generated by a direct current transformer which isolates the digital firing control from the motor armature. The present invention also includes detection circuits for a missing phase or an incorrect phase connection.

In view of the above, it may be seen that a number of modifications may be made to the system of the present invention as to individual components and their combinations without departing from its spirit and scope. For example, the number of input phases can be increased or decreased or the system can be applied to a direct current motor field winding. Accordingly, it is to be appreciated that the detailed example set forth above is for illustrative purposes and is not to be read in a limiting sense.

I claim:

1. An apparatus for controlling the firing angle of a triggerable switch comprising:
   a source of a first signal representing a desired change in the firing angle;
   a source of a second signal representing said desired change in the firing angle plus the angle between firing command signals when said first signal is zero wherein said source of a second signal includes timing means for generating timing signals and counting means responsive to said timing signals for generating said second signal in digital form; and
   means responsive to said first and second signals for generating said firing command signals for turning on said triggerable switch.

2. An apparatus as defined in claim 1 wherein said source of a first signal includes a source of an analog signal representing said desired change in the firing angle; means responsive to said analog signal for generating enable signals; and counting means responsive to said enable signals and said timing signals for generating said first signal in digital form.

3. An apparatus as defined in claim 2 wherein said analog signal has a first polarity representing a desired retardation in the firing angle and a second polarity representing a desired advance in the firing angle; and wherein said means for generating enable signals generates an increment enable signal in response to said analog signal of said first polarity and a decrement enable signal in response to said analog signal of said second polarity.

4. An apparatus for controlling the firing angle of triggerable switches in a converter, comprising:
   a source of a first signal representing a desired change in the firing angle;
   a clock means for generating a train of pulses;
   a source of a second signal representing said desired change in the firing angle pulse the angle between firing command signals when said first signal is zero wherein said source of a second signal includes a first counting means responsive to said clock pulse train for generating said second signal in digital form; and
   means responsive to said first and second signals for generating said firing command signals for turning on said triggerable switches in a predetermined sequence.

5. An apparatus as defined in claim 4 wherein said source of a first signal includes a source of an analog signal representing said desired change in the firing angle, said analog signal having a first polarity representing a desired retardation in the firing angle and a second polarity representing a desired advance in the firing angle; means responsive to said analog signal for generating an increment enable signal in response to said analog signal of said first polarity and a decrement enable signal in response to said analog signal of said second polarity; and a second counting means for accumulating the clock pulses of said clock pulse train to generate said first signal in digital form, said second counting means adding said clock pulses in response to said increment enable signal and subtracting said clock pulses in response to said decrement enable signal.

6. An apparatus as defined in claim 5 wherein said clock means includes a source of an alternating current signal representing the alternating current wave form applied to at least one of said triggerable switches; and means responsive to said alternating current signal for generating said train of pulses, each of said pulses representing a predetermined angular increment of a cycle of said alternating current wave form.

7. An apparatus for controlling the firing angle of a triggerable switch converter, comprising:
   a power source for supplying alternating current power to said converter;
   clock means responsive to the alternating current wave form of said power source for generating a train of pulses, each of said pulses representing a predetermined angular increment of a cycle of said wave form;

a source of a first signal representing a desired change in the firing angle;

a first counting means responsive to said first signal and said pulses for generating said first signal in digital form;

a second counting means responsive to said pulses for generating a second signal in digital form representing said desired change in the firing angle pulse the angle between firing command signals when said first signal is zero; and means responsive to said first and second signals in digital form for generating said firing command signals for turning on said triggerable switches in a predetermined sequence.

8. An apparatus as defined in claim 7 wherein said source of a first signal includes a source of a third signal representing the average current flowing through said converter; a source of a fourth signal representing an average current command; and an averaging means responsive to said third and fourth signals for generating an average current error signal representing the desired change in the firing angle.

9. An apparatus as defined in claim 8 wherein said averaging means includes means for selecting a first averaging period which is less than the time interval between said firing command signals when said first signal is zero if said firing angle is to be retarded and a second averaging period which is greater than the time interval between said firing command signals when said first signal is zero if said firing angle is to be advanced.

10. An apparatus as defined in claim 7 wherein said source of a first signal includes a source of a third signal representing the average current flowing through said converter; a source of a fourth signal representing an average current command; and a first summing means responsive to said third and fourth signals for generating a current error signal representing the desired change in the firing angle.

11. An apparatus as defined in claim 10 wherein said source of a first signal includes means responsive to said first signal in digital form for generating said first signal in analog form; a second summing means responsive to said current error signal and said first signal in analog form for generating an input signal having a first polarity representing a desired retardation in the firing angle and a second polarity representing a desired advance in the firing angle; and means responsive to said input signal for generating an increment enable signal in response to said input signal of said first polarity and a decrement enable signal in response to said input signal of said secondary polarity to said first counting means.

12. An apparatus as defined in claim 10 wherein said source of a first signal includes means responsive to the output signal of said first counting means in digital form for generating said output signal in analog form; a source of an offset angle signal; a second summing means responsive to said output signal in analog form and said offset angle signal for generating a first input signal representing the difference between said output signal in analog form and said offset angle signal; a third summing means responsive to said current error signal and said first input signal for generating a second input signal representing the difference between said current error signal and said first input signal, said second input signal having a first polarity representing a desired retardation in the firing angle and a second polarity representing a desired advance in the firing angle; and means responsive to said second input signal for generating an increment enable signal in response to said second input signal of said first polarity and a decrement enable signal in response to said second input signal of said second polarity to said first counting means wherein said first counting means generates said output signal in digital form representing said first signal and said offset angle signal.

13. An apparatus as defined in claim 10 wherein said source of a third signal includes a current shunt connected in series between said converter and a load for generating a signal representing the current flowing in said converter, and a direct current transformer responsive to said signal from said shunt for generating said third signal representing the average current flowing through said converter whereby said third signal is relatively noise free.

14. An apparatus as defined in claim 13 wherein said direct current transformer includes a first transformer; first switching means connected between said shunt and the primary of said first transformer; second switching means connected between said first summing means and the secondary of said first transformer; and means responsive to said pulses from said clock means for switching said first and second switching means to pass said third signal through said first transformer.

15. An apparatus as defined in claim 14 wherein the said means responsive to said pulses includes third switching means responsive to said pulses, and a second transformer connected between said third switching means and said first and second switching means for passing said pulses to said first and second switching means.

16. An apparatus as defined in claim 7 wherein said means responsive to said first and second signals in digital form includes means responsive to said first signal in digital form and that portion of said second signal in digital form representing said desired change in the firing angle for generating said firing command signals; and means responsive to said firing command signals for generating a reset signal to said second counting means to reset said second signal.

17. An apparatus as defined in claim 7 wherein said means responsive to said first and second signals in digital form includes means comparing said first and second signals for generating gating signals for each of said triggerable switches and latching means responsive to said firing command signals for storing said gating signals.

18. An apparatus as defined in claim 7 wherein said power source is a multiphase alternating current power source and including means responsive to each of the phases of said power source for generating a power line missing signal when at least one of the phases of said power source is not connected to said converter.

19. An apparatus as defined in claim 18 wherein said means for generating a power line missing signal includes means responsive to each of the phases of said power source for generating a half wave rectified signal of one polarity for each of said phases, means for generating a direct current signal of the opposite polarity, and means responsive to said half wave rectified signals and said direct current signal for generating said power line missing signal when at least one of said half wave rectified signals is not generated.

20. An apparatus as defined in claim 19 wherein said means responsive to said half wave rectified signals and said direct current signals includes means for summing said signals and inversion means responsive to said direct current signal when at least one of said half wave rectified signals is not generated for generating said power line missing signal.

21. An apparatus as defined in claim 7 wherein said power source is a multiphase alternating current power source and including means for generating an alternating current wave form having a predetermined phase relationship with one of the phases of said power source, means responsive to said one phase for generating a pair of unipolar signals which are synchronized with the opposite polarity portion of said alternating current wave form when the phases of said power source are correctly connected to said converter, and means responsive to said alternating current wave form and said pair of unipolar signals for generating an incorrect phasing signal when at least one of the phases of said power source is incorrectly connected to said converter.

22. An apparatus as defined in claim 21 wherein said means for generating an incorrect phasing signal includes means for summing said alternating current wave form and said pair of unipolar signals and inversion means responsive to said alternating current wave form when at least one of said phases of said power source is incorrectly connected for generating said incorrect phasing signal.

23. A direct current transformer for generating a relatively noise free output signal, comprising:
a source of a signal representing current flow in a load;
a first transformer;
first switching means connected between said signal source and the primary of said first transformer;
second switching means connected to the secondary of said first transformer;
clock means for generating a train of clock pulses; and
means responsive to said clock pulses for switching said first and second switching means for generating said relatively noise free output signal at the output of said second switching means.

24. An apparatus as defined in claim 23, wherein said means for switching includes third switching means responsive to said clock pulses for generating switching pulses and a second transformer connected between said third switching means and said first and second switching means for passing said switching pulses to said first and second switching means for switching said first and second switching means.

25. An apparatus as defined in claim 23 wherein said clock means includes a source of an alternating current wave form; means responsive to said alternating current wave form and a first train of timing pulses of a first predetermined frequency for generating a control signal; means responsive to said control signal for generating a second train of timing pulses of a second predetermined frequency; first frequency dividing means responsive to said second timing pulse train for generating said first timing pulse train; and second frequency dividing means responsive to said second timing pulse train for generating said train of clock pulses.

26. An apparatus for determining when at least one phase of a multi-phase alternating current power source is not connected to a load comprising:
rectifying means connected to said power source at said load for generating a half wave rectified output signal;
a source of a signal having a polarity opposite the polarity of said output signal; and
means responsive to said output signal and said signal of opposite polarity for generating a power line missing signal when at least one of the phases of said power source is not connected to said load wherein said means for generating said power line missing signal includes an amplifier having an input connected to said rectifying means and said source of an opposite polarity signal and an output, a first capacitor and a first diode connected in series between said amplifier output and ground and a second diode connected in series with said first diode between said input and ground whereby said amplifier generates said power line missing signal at said output.

27. An apparatus as defined in claim 26 wherein said means for generating said power line missing signal includes a second capacitor connected between said input and said output of said amplifier whereby said amplifier generates said power line missing signal at said output.

28. An apparatus for determining when at least one phase of a multi-phase alternating current power source is incorrectly connected to a load, comprising:
means for generating an alternating current wave form having a predetermined phase relationship with one of the phases of said power source;
means responsive to said one phase for generating at least one unipolar signal coinciding with the negative portion of said alternating current wave form when the phases of said power source are correctly connected to said load wherein said means for generating at least one unipolar signal includes means responsive to said one phase and a first pulse train of a first predetermined frequency for generating a control signal, means responsive to said control signal for generating a second pulse train of a second predetermined frequency, first frequency dividing means responsive to said second pulse train for generating said first pulse train, and second frequency dividing means responsive to said second pulse train for generating said unipolar signal; and
means responsive to said alternating current wave form and said one unipolar signal for generating an incorrect phasing signal when at least one of said phases of said power source is incorrectly connected to said load.

29. An apparatus for determining when at least one phase of a three phase alternating current power source is incorrectly connected to a load, comprising: means for generating an alternating current wave form having a predetermined phase relationship with one of the phases of said power source wherein said means for generating said alternating current wave form includes a first transformer having a primary connected to a first phase of said power source, a second transformer having a primary connected to a second phase of said power source, a first impedance element connected between the junction of one end of the secondary of said first transformer and one end of the secondary of said second transformer and ground, a second impedance element connected between the other end of the secondary of said first transformer and ground and a third impedance element connected between the other end of the secondary of said second transformer and ground whereby said alternating current wave form is developed across said third impedance element;

means responsive to said one phase for generating at least one unipolar signal coinciding with the negative portion of said alternating current wave form when the phases of said power source are correctly connected to said load; and means responsive to said alternating current wave form and said one unipolar signal for generating an incorrect phasing signal when at least one of said phases of said power source is incorrectly connected to said load.

30. An apparatus as defined in claim 29 wherein said means responsive to said one phase includes means responsive to the wave form developed across said second impedance element for generating a first unipolar signal which lags said wave form developed across said second impedance element by 60° and has a duration of 120° and a second unipolar signal of the same polarity as said first unipolar signal which lags said first unipolar signal by 60° and has a duration of 120°.

31. An apparatus as defined in claim 30 wherein said means for generating an incorrect phasing signal includes an amplifier having an inverting input connected to the output of said means for generating said alternating current signal and said means for generating said first and second unipolar signals, and a first capacitor connected between said inverting input and an output of said amplifier whereby said amplifier generates said incorrect phasing signal.

32. An apparatus as defined in claim 31 wherein said means for generating an incorrect phasing signal includes a second capacitor and a first diode connected in series between said amplifier output and ground and a second diode connected in series with said first diode between said inverting input and ground.

33. The combination, comprising:
a power source for supplying electric power having a cyclic wave form;
a load;
at least one triggerable switch connected between said power source and said load;
timing means responsive to said cyclic wave form for generating timing signals representing a predetermined angular increment of a cycle of said wave form;
means responsive to said timing signals for generating a first signal in digital form representing a desired change in a standard timed interval;
means responsive to said timing signals for generating a second signal representing said desired change in said standard timed interval plus the duration of said standard timed interval between said firing command signals generated when said first signal is zero; and
means responsive to said first and second signals for generating firing command signals at timed intervals for turning on said triggerable switch on a time basis referenced form the previously generated firing command signal.

34. An apparatus as defined in claim 33 wherein said means responsive to said first and second signals expands or contracts the duration of said standard timed interval in response to said first signal.

35. An apparatus as defined in claim 33 wherein said means for generating a first signal includes a source of a third signal representing the average current flowing through said triggerable switch; a source of a fourth signal representing an average current command; and a first summing means responsive to said third and fourth signals for generating a current error signal representing the desired change in the standard timed interval.

36. An apparatus as defined in claim 35 wherein said means for generating a first signal includes means for generating said first signal in digital form; means responsive to said first signal in digital form for generating said first signal in analog form; a second summing means responsive to said current error signal and said first signal in analog form for generating an input signal having a first polarity representing a desired expansion of the duration of said standard timed interval and a second polarity representing a desired contraction in the duration of the standard timed interval; and means responsive to said input signal for generating an increment enable signal in response to said input signal of said first polarity and a decrement enable signal in response to said input signal of said second polarity; and a first counting means responsive to said increment enable signal, said decrement enable signal, and said timing signals for generating said first signal in digital form.

37. An apparatus as defined in claim 35 wherein said means for generating a first signal includes a first counting means responsive to said first signal and said timing signals for generating an output signal in digital form; means responsive to said output signal in digital form for generating said output signal in analog form; a source of an offset angle signal; a second summing means responsive to said output signal in analog form and said offset angle signal for generating a first input signal representing the difference between said output signal in analog form and said offset angle signal; a third summing means responsive to said current error signal and said first input signal for generating a second input signal representing the difference between said current error signal and said first input signal, said second input signal having a first polarity representing a desired expansion of the duration of said standard timed interval and a second polarity representing a desired contraction of the duration of said standard timed interval; and means responsive to said second input signal for generating an increment enable signal in response to said second input signal of said first polarity and a decrement enable signal in response to said second input signal of said second polarity to said first counting means wherein said first counting means generates said output signal in digital form representing said first signal and said offset angle signal.

38. An apparatus as defined in claim 35 wherein said source of a third signal includes a current shunt connected in series between said triggerable switch and said load for generating a signal representing the current flowing through said switch, and a direct current transformer responsive to said signal from said shunt for generating said third signal representing the average current flowing through said switch whereby said third signal is relatively noise free.

39. An apparatus as defined in claim 38 wherein said direct current transformer includes a first transformer; first switching means connected between said shunt and the primary of said first transformer; second switching means connected between said first summing means and the secondary of said first transformer; and means responsive to said timing signals for switching said first and second switching means to pass said third signal through said first transformer.

40. An apparatus as defined in claim 39 wherein said means responsive to said timing signals includes third switching means responsive to said timing signals, and a second transformer connected between said third switching means and said first and second switching means for passing said timing signals to said first and second switching means.

41. An apparatus as defined in claim 39 wherein said timing means includes means responsive to said cyclic wave form and a first train of timing pulses of a first predetermined frequency for generating a control signal; means responsive to said control signal for generating a second train of timing pulses of a second predetermined frequency; first frequency dividing means responsive to said second timing pulse train for generating said first timing pulse train; and second frequency dividing means responsive to said second timing pulse train for generating said timing signals.

42. An apparatus as defined in claim 33 wherein said second signal is in digital form and said means responsive to said first and second signals includes means responsive to said first signal in digital form and that portion of said second signal in digital form representing said desired change of the duration of said standard timed interval for generating said firing command signals; and means responsive to said firing command signals for generating a reset signal to said means for generating said first and second signals in digital form to reset said second signal.

43. An apparatus as defined in claim 33 wherein said second signal is in digital form and said means responsive to said first and second signals includes means comparing said first and second signals for generating gating signals for said triggerable switch; and latching means responsive to said firing command signals for storing said gating signals.

44. An apparatus as defined in claim 33 wherein said power source is a multiphase alternating current power source and including means responsive to each phase of said power source for generating a half wave rectified signal of one polarity for each of said phases; means for generating a direct current signal of the opposite polarity; and means responsive to said half wave rectified signals and said direct current signal for generating a power line missing signal when at least one of said half-wave rectified signals is not generated.

45. An apparatus as defined in claim 33 wherein said power source is a multiphase alternating current power source and including means for generating an alternating current wave form having a predetermined phase relationship with one of the phases of said power source, means responsive to said one phase for generating a pair of unipolar signals which are synchronized with the opposite polarity portion of said alternating current wave form when the phases of said power source are correctly connected to said triggerable switches, and means responsive to said alternating current wave form and said pair of unipolar signals for generating an incorrect phasing signal when at least one of the phases of said power source is incorrectly connected to said triggerable switches.

46. An apparatus as defined in claim 45 wherein said means for generating an incorrect phasing signal includes means for summing said alternating current wave form and said pair of unipolar signals and inversion means responsive to said alternating current wave form when at least one of said phases of said power source is incorrectly connected for generating said incorrect phasing signal.

47. An apparatus as defined in claim 45 wherein said means for generating a pair of unipolar signals includes means responsive to said one phase and a first pulse train of a first predetermined frequency for generating a control signal; means responsive to said control signal for generating a second pulse train of a second predetermined frequency; first frequency dividing means responsive to said second pulse train for generating said first pulse train; and second frequency dividing means responsive to said second pulse train for generating said unipolar signals.

48. A method of controlling the firing angle of a triggerable switch, comprising the steps of:
applying electric power having a cyclic wave form to an input of said triggerable switch;
generating timing signals representing a predetermined angular increment of a cycle of said wave form;
generating a first signal representing a desired change in a standard timed interval in response to said timing signals;
generating a second signal in digital form, representing said desired change in said standard timed interval plus the duration of said standard timed interval between said firing command signals generated when said first signal is zero, in response to said timing signals; and
generating firing command signals at timed intervals in response to said first and second signals for turning on said triggerable switch on a time basis referenced from the previously generated firing command signal.

49. The method as defined in claim 48 wherein the step of generating said firing command signals for turning on said triggerable switch in response to said first and second signals includes the step of expanding or contracting the duration of said standard timed interval in response to said first signal.

* * * * *

UNITED STATES PATENT OFFICE
CERTIFICATE OF CORRECTION

Patent No. 4,063,146                Dated December 13, 1977

Inventor(s)   THEODORE A. OLIVER

It is certified that error appears in the above-identified patent and that said Letters Patent are hereby corrected as shown below:

Column 9, line 30 change "PNF" to - - PNP - - .
Column 13, line 5 change " $\alpha \Delta$ " to - - $\Delta \alpha$ - - .
Column 14, line 27 change "rest" to - - reset - - .
Column 16, line 17 change "196" to - - 197 - - .
Column 16, line 40 change "196" to - - 197 - - .
Column 16, line 62 change "to" to - - at - - .
Column 18, line 63 change "291-3" to - - 219-3 - - .
Column 19, line 2 change "reseet" to - - reset - - .
Column 19, line 26 change "o" to - - to - - .
Column 19, line 46 change "exclusive-13OR" to - - exclusive-OR - - .
Column 20, line 53 change "the" to - - The - - .
Column 21, line 13 change "input" to - - inputs - - .
Column 21, line 36 after "outputs" insert - - ,outputs - - .
Column 21, line 46 before "is" insert - - it - - .
Column 21, line 52 change "(not whown)" to - - (not shown)- - .
Column 21, line 64 after "from" delete - - the - - .
Column 22, line 29 change "unitl" to - - until - - .
Column 22, line 35 change "ofthe" to - - of the - - .
Column 26, line 26 change "pulse" to - - plus - - .
Column 27, line 8 change "pulse" to - - plus - - .
Column 27, line 51 change "secondary" to - - second - - .

Signed and Sealed this

Twenty-seventh Day of February 1979

[SEAL]

Attest:

RUTH C. MASON
Attesting Officer

DONALD W. BANNER
Commissioner of Patents and Trademarks